United States Patent
Park

(10) Patent No.: US 9,117,164 B2
(45) Date of Patent: Aug. 25, 2015

(54) IMAGE FORMING APPARATUS SUPPORTING WIFI DIRECT AND METHOD OF CONTROLLING INTERNET ACCESS IN IMAGE FORMING APPARATUS

(71) Applicant: Samsung Electronics Co., Ltd., Suwon-si, Gyeonggi-do (KR)

(72) Inventor: Hyun-wook Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 66 days.

(21) Appl. No.: 13/908,124

(22) Filed: Jun. 3, 2013

(65) Prior Publication Data

US 2014/0085666 A1 Mar. 27, 2014

(30) Foreign Application Priority Data

Sep. 26, 2012 (KR) .................. 10-2012-0107490

(51) Int. Cl.
*H04Q 7/24* (2006.01)
*G06K 15/00* (2006.01)
*H04W 4/00* (2009.01)
*H04W 84/12* (2009.01)
*H04W 84/22* (2009.01)
*H04L 29/12* (2006.01)

(52) U.S. Cl.
CPC ............. *G06K 15/405* (2013.01); *H04W 4/008* (2013.01); *H04L 61/2015* (2013.01); *H04W 84/12* (2013.01); *H04W 84/22* (2013.01)

(58) Field of Classification Search
None
See application file for complete search history.

(56) References Cited

U.S. PATENT DOCUMENTS

| 2010/0205305 | A1 | 8/2010 | Bajko |
| 2011/0082940 | A1* | 4/2011 | Montemurro et al. ........ 709/227 |
| 2012/0133971 | A1 | 5/2012 | Park |
| 2013/0057912 | A1 | 3/2013 | Park |
| 2013/0107318 | A1* | 5/2013 | Yamada ...................... 358/1.15 |
| 2013/0128311 | A1 | 5/2013 | Kim et al. |

FOREIGN PATENT DOCUMENTS

| JP | 2009-010779 | 1/2009 |
| KR | 10-2012-0056550 | 6/2012 |
| KR | 10-2013-0056670 | 5/2013 |

OTHER PUBLICATIONS

PCT Office Action dated Dec. 30, 2013 issued in PCT Application No. PCT/KR2013/008571.
European Office Action dated Dec. 30, 2013 issued in EP Application No. 13176812.9.
Inventek Systems: "ES-WiFi Module Application NOTEAN20052;Software Enabled Access Point (SOFTAP) Functionality", Jul. 20, 2012, pp. 1-12, XP055095483.
"Wi-Fi Peer-To-Peer(P2P) Specification V1.2", Wi-Fi Peer-To-Peer(P2P) Specification V1.2, Wi-Fi Alliance, US, vol. V1.2, Dec. 14, 2011, pp. 1-159, XP008165048.

* cited by examiner

Primary Examiner — Duc C Ho
(74) Attorney, Agent, or Firm — Staas & Halsey LLP

(57) ABSTRACT

An image forming apparatus that supports WiFi Direct, includes a user interface unit to receive a command from a user, a WiFi-Direct connection unit to perform WiFi-Direct connection with an external wireless terminal, an Internet connection unit to perform connection to the Internet, a control unit to permit or prohibit Internet access of the WiFi-Direct connected wireless terminal made through the Internet connection unit, a soft access point (AP) module to allow the image forming apparatus to operate as an AP in WiFi-Direction connection with the wireless terminal, a dynamic host configuration protocol (DHCP) server module to allocate a network address to the wireless terminal if the image forming apparatus operates as an AP, and an image forming operation execution unit to perform an image forming operation under control of the control unit.

31 Claims, 16 Drawing Sheets

IMAGE FORMING APPARATUS SUPPORTING WIFI DIRECT AND METHOD OF CONTROLLING INTERNET ACCESS IN IMAGE FORMING APPARATUS

CROSS-REFERENCE TO RELATED APPLICATIONS

This application claims priority under 35 U.S.C. §119(a) from Korean Patent Application No. 10-2012-0107490, filed on Sep. 26, 2012, in the Korean Intellectual Property Office, the disclosure of which is incorporated herein in its entirety by reference.

BACKGROUND OF THE INVENTION

1. Field of the Invention

The present general inventive concept relates to an image forming apparatus supporting WiFi Direct, and more particularly, to a method of controlling Internet access of a wireless terminal connected to an image forming apparatus that supports WiFi Direct, in the image forming apparatus.

2. Description of the Related Art

Today, Peer to Peer (P2P) communication that directly connects wireless devices without using a separate wireless connection device has become common in use, and a representative technique enabling P2P communication may include BLUETOOTH technology. BLUETOOTH is slightly limited in terms of transmission speed and transmission range, but as new versions are continuously developed, BLUETOOTH devices have been improving.

WiFi, which is a wireless Local Area Network (LAN) standard based on the Institute of Electrical and Electronics Engineers (IEEE) 802.11 prescribed in the WiFi Alliance, allows a use of ultra high-speed Internet through access to an access point (AP) connected to an infra network, but when an ad-hoc function is used, P2P communication is also possible. However, when the ad-hoc function is used, security is weak and transmission speed decreases, and a setup method is not easy to execute. Thus, recently, the WiFi Alliance has proposed WiFi Direct as a technique to allow P2P communication. WiFi Direct enables P2P connection between wireless devices without using an AP, supports a maximum speed of 250 Mbps, and allows security setup using WiFi Protected Access 2 (WPA2), thereby substantially remedying disadvantages of the ad-hoc communication. Moreover, by supporting a transmission range of up to 200 m, WiFi Direct emerges as a new alternative to P2P communication.

As such, with the recent emergence of WiFi Direct, the use of P2P communication seems to increase and the P2P communication technique may also be applied to an image forming apparatus such as a printer, a scanner, a facsimile, or a complex machine. Therefore, for safe and convenience use of an image forming apparatus which supports P2P connection, techniques for user authentication, connection control, authority control, and security management are required.

SUMMARY OF THE INVENTION

The present general inventive concept provides a method of controlling Internet access of a wireless terminal connected to an image forming apparatus that supports WiFi Direct, in the image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing an image forming apparatus that supports WiFi Direct, the image forming apparatus including a user interface unit to receive a command from a user, a WiFi-Direct connection unit to perform a WiFi-Direct connection with an external wireless terminal, an Internet connection unit to perform a connection to the Internet, a control unit to permit or prohibit Internet access of the WiFi-Direct connected wireless terminal made through the Internet connection unit, a soft access point (AP) module to allow the image forming apparatus to operate as an AP in WiFi-Direction connection with the wireless terminal, a dynamic host configuration protocol (DHCP) server module to allocate a network address to the wireless terminal if the image forming apparatus operates as an AP, and an image forming operation execution unit to perform an image forming operation under control of the control unit.

The control unit may include a network address translation (NAT) execution unit to translate a network address included in a packet transmitted from the wireless terminal and transmitting the packet to the Internet connection unit, and an NAT management unit to control the NAT execution unit according to whether Internet access of the wireless terminal is permitted or prohibited.

The control unit may identify a device type of the wireless terminal and permits or prohibits Internet access of the wireless terminal according to the identified device type.

If the identified device type is an Internet-access-prohibited device type, the control unit may control the DHCP server module to allocate no gateway address or a null value to the wireless terminal.

If the identified device type is an Internet-access-prohibited device type, the NAT management unit may control the NAT execution unit not to translate a network address included in the packet transmitted from the wireless terminal.

The control unit may permit or prohibit Internet access of the wireless terminal according to a current operating state of the image forming apparatus.

If the current operating state of the image forming apparatus is an operating state in which Internet access is prohibited, the NAT management unit may control the NAT execution unit not to translate a network address included in the packet transmitted from the wireless terminal.

The control unit mat permit Internet access of the wireless terminal if the packet transmitted from the wireless terminal is a packet to execute a printing function, and may prohibit Internet access of the wireless terminal if the transmitted packet is not the packet to execute the printing function.

The control unit may check a network port included in the packet transmitted from the wireless terminal to determine whether the transmitted packet is the packet to execute the printing function.

The control unit may permit or prohibit Internet access of the wireless terminal according to user setting input through the user interface.

The foregoing and/or other features and utilities of the present general inventive concept may also be achieved by providing a method of controlling Internet access in an image forming apparatus that supports WiFi Direct, the method including performing connection to the Internet, driving a soft access point (AP) module provided in the image forming apparatus to allow the image forming apparatus to operate as an AP, receiving a WiFi-Direct connection request from an external wireless terminal, driving a dynamic host configuration protocol (DHCP) server module provided in the image forming apparatus to allocate a network address to the wireless terminal and perform WiFi-Direct connection with the wireless terminal, receiving a request to perform Internet access through the image forming apparatus from the wireless terminal, determining whether to permit or prohibit Internet access of the wireless terminal, and permitting or prohibiting Internet access of the wireless terminal according to a result of the determination.

The receiving of the request to perform Internet access may include receiving a packet destined to a server in the Internet from the wireless terminal.

The permitting or prohibiting of Internet access may include translating a network address included in the received packet and sending the packet to the server in the Internet if Internet access is permitted, and not sending the received packet to the server in the Internet if Internet access is prohibited.

The allocating of the network address to the wireless terminal and the performing of WiFi-Direct connection with the wireless terminal may include allocating no gateway address or a null value to the wireless terminal if a device type of the wireless terminal is an Internet-access-prohibited device type or Internet access is set to be prohibited with respect to the WiFi-Direct connected wireless terminal.

The determining may include identifying a device type of the wireless terminal and determining whether to permit or prohibit Internet access of the wireless terminal according to the identified device type.

The determining may include checking a current operating state of the image forming apparatus and determining whether to permit or prohibit Internet access of the wireless terminal according to the checked current operating state of the image forming apparatus.

The receiving of the request to perform Internet access may include receiving a packet destined to a server in the Internet from the wireless terminal, the determining comprises determining whether the received packet is a packet to execute a printing function, and if the received packet is the packet to execute the printing function, determining to permit Internet access of the wireless terminal, and if the received packet is not the packet to execute the printing function, determining to prohibit Internet access of the wireless terminal.

The determining of whether the received packet is the packet to execute the printing function comprises checking a network port included in the received packet and determining based on the checked network port whether the received packet is the packet to execute the printing function.

The determining may include determining whether to permit or prohibit Internet access of the wireless terminal according to setting input from the user.

The foregoing and/or other features and utilities of the present general inventive concept may also be achieved by providing a computer-readable medium having recorded thereon a program to execute a method of controlling Internet access in an image forming apparatus that supports WiFi Direct, the method including performing connection to the Internet, driving a soft access point (AP) module provided in the image forming apparatus to allow the image forming apparatus to operate as an AP, receiving a WiFi-Direct connection request from an external wireless terminal, driving a dynamic host configuration protocol (DHCP) server module provided in the image forming apparatus to allocate a network address to the wireless terminal and perform WiFi-Direct connection with the wireless terminal, receiving a request to perform Internet access through the image forming apparatus from the wireless terminal, determining whether to permit or prohibit Internet access of the wireless terminal, and permitting or prohibiting Internet access of the wireless terminal according to a result of the determination.

The foregoing and/or other features and utilities of the present general inventive concept may also be achieved by providing an image forming apparatus that supports WiFi Direct, the image forming apparatus including a WiFi-Direct connection unit to perform WiFi-Direct connection with a WiFi Direct external wireless terminal, a control unit to determine whether to prohibit Internet access of the WiFi Direct connected external wireless terminal based on a device type of the WiFi Direct connected external wireless terminal, and a dynamic host configuration protocol (DHCP) server module to allocate a network address to the WiFi Direct connected external wireless terminal based on the determination of the control unit.

The image forming apparatus may further include a user interface to allow a user to input a device discovery request to find WiFi Direct external wireless terminals neighboring the image forming apparatus.

The user interface may display a list of the WiFi Direct external wireless terminals neighboring the image forming apparatus to allow a user to select at least one of the WiFi Direct external wireless terminals neighboring the image forming apparatus.

The Internet access of the WiFi Direct connected external wireless terminal may be prohibited when the device type corresponds to a device that is able to download a large-volume file.

The large-volume file may be at least 10 MB.

The image forming apparatus may further include an image forming operation execution unit to execute an image forming operation under control of the control unit.

The prohibiting of the Internet access may be based on an operation state of the image forming apparatus based on the executed image forming operation.

The prohibiting of the Internet access may be performed if the image forming operation would be disrupted as a result of the Internet access.

The prohibiting of the Internet access may be performed by the control unit controlling the DHCP server module to allocate no network address to the WiFi Direct connected external wireless terminal.

The control unit may include a network address translation (NAT) execution unit to translate a network address of a data packet destined to a server within the Internet from the WiFi Direct connected external wireless terminal, and an Internet connection unit to receive the data packet and to allow the data packet to be sent to the destined server.

The prohibiting of the Internet access may be performed by the NAT execution unit not performing NAT with the received packet and not transmitting the received packet to the destined server.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
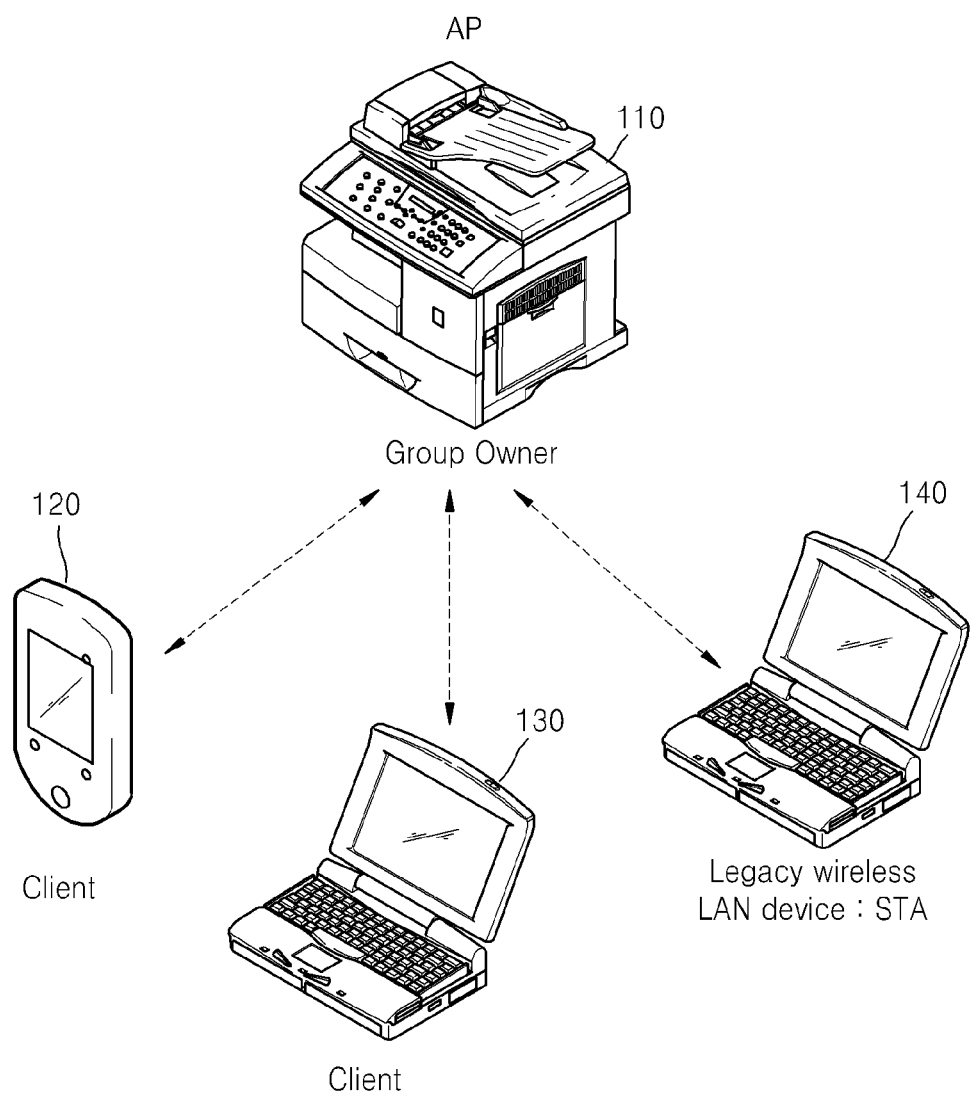
FIG. 1 is a diagram illustrating devices supporting WiFi Direct and a legacy wireless Local Area Network (LAN) device that are wirelessly connected to one another and thus form a wireless network.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, as an example of an image forming apparatus which supports P2P connection, a multifunction printer (MFP) that supports WiFi Direct will be used to describe exemplary embodiments of the present general inventive concept. However, the scope of the present general inventive concept is not limited to this example and may be defined by the appended claims.

First, before undertaking description of exemplary embodiments of the present general inventive concept, basic connection and operations of a complex machine that supports WiFi Direct will be described with reference to the accompanying drawings.

FIG. 1 is a diagram illustrating wireless Local Area Network (LAN) devices that support WiFi Direct and a legacy wireless LAN (WLAN) device that are wirelessly connected to form a wireless network. Referring to FIG. 1, a complex machine 110 that supports WiFi Direct is wirelessly connected with a smart phone 120 that supports WiFi Direct, a notebook Personal Computer (PC) 130 that supports WiFi Direct, and a legacy WLAN notebook PC 140. Herein, the legacy WLAN notebook PC 140 refers to a notebook PC to which a legacy WLAN technique that does not support WiFi Direct is applied.

A WLAN device that supports WiFi Direct (hereinafter, a 'WiFi Direct device'), unlike legacy WiFi devices, is capable of performing peer to peer (P2P) connection without using a network infrastructure. More specifically, to form a wireless network, a legacy WiFi technique must wirelessly connect a WiFi device to a router connected to an already established within a network infrastructure, that is, an access point (AP). WiFi devices wirelessly connected to the AP are assumed to each serve as individual stations.

However, in a WiFi Direct technique, one of WiFi Direct devices used to form a wireless network serves as an access point (AP) and the other WiFi Direct devices are wirelessly connected to the WiFi Direct device serving as the AP to serve as stations. Therefore, without the AP connected to the network infrastructure, the wireless network may be formed between the WiFi Direct devices. If the wireless network is formed between the WiFi Direct devices, legacy WLAN devices such as WiFi devices may recognize a WiFi Direct device, which serves as an AP, as an AP and may be wirelessly connected to the WiFi Direct device.

Referring to FIG. 1, the WiFi Direct devices including the WiFi Direct complex machine 110, the WiFi Direct smart phone 120, and the WiFi Direct notebook PC 130 form a wireless network without an AP connected to a network infrastructure. As such, devices supporting WiFi Direct without an AP connected to an infra network may be wirelessly connected to form a P2P group.

In this case, the WiFi Direct complex machine 110 serves as an AP, and a device serving as an AP among WiFi Direct devices is referred to as a group owner (GO) of the P2P group. The WiFi Direct smart phone 120 and the WiFi Direct notebook PC 130 are wirelessly connected to the WiFi Direct complex machine 110, which is the GO, to serve as stations, and these devices are called clients. The legacy WLAN notebook PC 140, which does not support WiFi Direct, recognizes the WiFi Direct complex machine 110, which is the GO, as an AP and is wirelessly connected to the WiFi Direct complex machine 110, thus being connected to the wireless network formed by the WiFi Direct devices.

While the complex machine 110 among the WiFi Direct devices is the GO in FIG. 1, one of the smart phone 120 and the notebook PC 130, which are the other WiFi Direct devices, may be a GO and the complex machine 110 may be a client. The WiFi Direct device that is to be a GO is determined by negotiation in a WiFi Direct connection procedure, as will be described in detail below.

A WiFi Direct device may be itself a GO prior to connection without negotiation, and this WiFi Direct device is called an autonomous group owner (AGO). A wireless network formed around the AGO is called an autonomous P2P group. When the autonomous P2P group is formed, a legacy WLAN device may recognize the AGO as if it is an AP of an infra network and may be connected to the AGO.

While WiFi Direct devices form a P2P group without an AP connected to a network in FIG. 1, in case of existence of the AP connected to the network, the WiFi Direct devices may be connected to the AP and serve as stations.

Hereinafter, with reference to the accompanying drawings, a procedure of performing wireless connection between WiFi Direct devices and a WiFi Direct technique will be described in detail. To facilitate understanding, a complex machine that supports WiFi Direct (hereinafter, a 'WiFi Direct complex machine') will be used as an example, but the scope of the present general inventive concept is not limited thereto and may include a printer, a scanner, or a facsimile that supports WiFi Direct. Also, in the present general inventive concept, WiFi Direct is used as an example of P2P communication, but embodiments using other types of P2P communication such as BLUETOOTH or ZIGBEE may also be included in the scope of the present general inventive concept.

Figure 2:
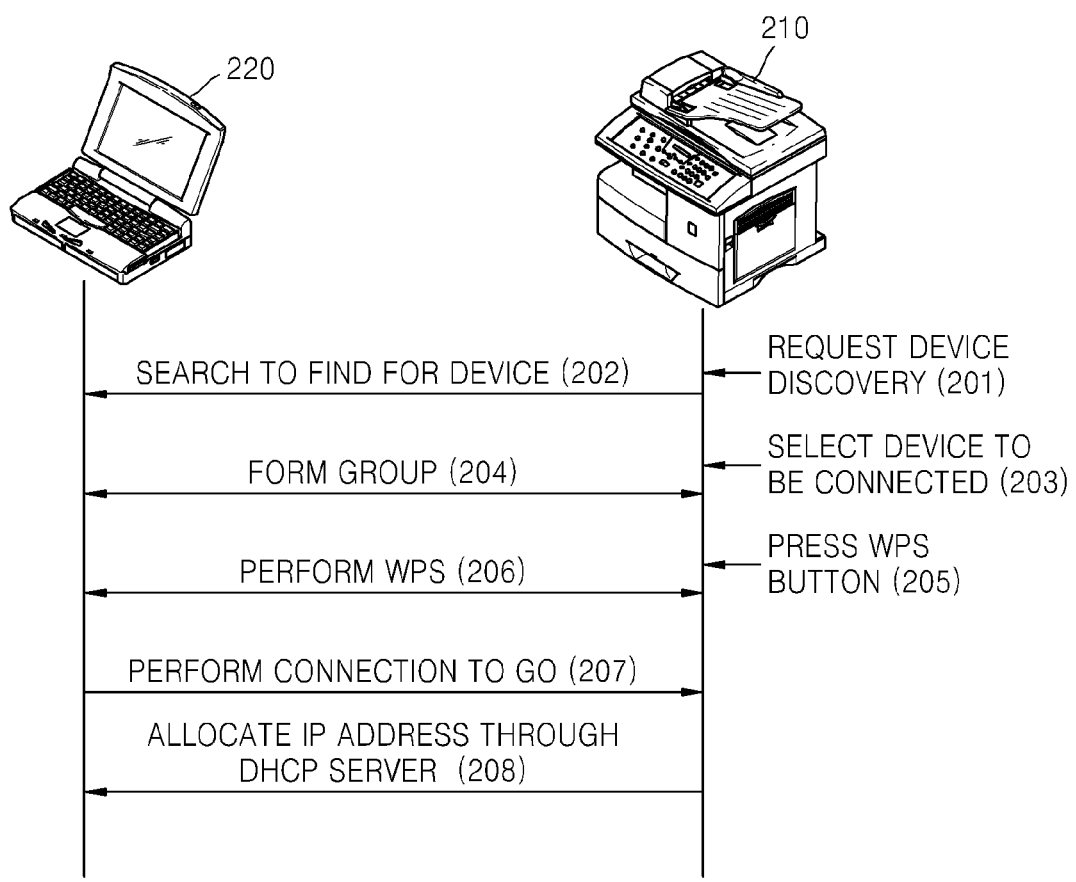
FIG. 2 is a diagram illustrating a wireless connection procedure between devices supporting WiFi Direct.

FIG. 2 is a diagram illustrating a procedure of performing wireless connection between WiFi Direct devices, more specifically, a procedure to perform WiFi Direct connection between the WiFi Direct complex machine 210 and the WiFi Direct notebook PC 220. The WiFi Direct connection procedure may roughly include device discovery, group formation, and security connection.

Referring to FIG. 2, the complex machine 210, which is one of the WiFi Direct devices, receives a device discovery request from a user in operation 201, and searches to find a neighboring WiFi Direct device in operation 202. The device discovery request may be received through a user interface of the complex machine 210, for example, a user interface implemented in a display unit such as a liquid crystal display (LCD) provided in the complex machine 210. If a neighboring WiFi Direct device is discovered as a result of device discovery in the complex machine 210, the complex machine 210 shows the discovered device to the user through the display unit and receives a connection request from the user in operation 203. The connection request 203 may also be received by a user pressing a button or a touch panel through the display unit of the complex machine 210, and if there are a plurality of discovered WiFi Direct devices, the complex machine 210 may show a list of the discovered WiFi Direct devices to the user through the display unit and the user may select one or more devices from among them and request connection thereto.

Upon receiving the connection request in operation 203, group formation is performed between WiFi Direct devices to be connected in operation 204. Group formation refers to determining which WiFi Direct devices are to be connected and which WiFi Direct device is to serve as a GO or a client. Which WiFi Direct device is to serve as a GO is determined by negotiation between WiFi Direct devices, as will be described below with reference to FIG. 4.

Once a group is formed, devices belonging to the group are security-connected, by using a WiFi protected setup (WPS) technique The WPS technique refers to simply security-connecting WiFi devices. WPS may include a personal identification number (PIN) scheme and a push button configuration (PBC) scheme, in which the PIN scheme performs security connection by inputting a preset PIN code and the PBC scheme performs security connection by pressing a WPS button provided in a WiFi Direct device.

Herein, the PBC scheme will be described as an example. The user may request security connection by pressing the WPS button provided in the complex machine 210 in operation 205. Within a predetermined time (generally, 120 seconds) thereafter, the security connection may be performed by pressing a WPS button provided in the notebook PC 220 or a WPS button implemented on an application program to perform the WiFi Direct connection of the notebook PC 220. The WPS button implemented on the application program for WiFi Direct connection of the notebook PC 220 refers to an object displayed on a display unit of the notebook PC 220 in the application program for WiFi Direct connection. A detailed example of the WPS button implemented on the application program is indicated by 510 of FIG. 5.

The user may request security connection by clicking the WPS button displayed on the display unit of the notebook PC 220 by using a mouse or similar device. Once security connection is requested by pressing the WPS button, the device determined to serve as a GO among the WiFi Direct devices in the group formation procedure transmits security information to a device determined to serve as a client in operation 206. In WiFi Direct, security connection is performed by encryption based on a WiFi protected access 2 (WPA2)—Pre-shared key (PSK) authentication scheme, such that stronger security performance than a legacy wired equivalent privacy (WEP) or WiFi protected access (WPA) scheme.

Once WPS is executed, the WiFi Direct device serving as a client is connected to the WiFi Direct device serving as a GO in operation 207, and the WiFi Direct device serving as a GO automatically allocates an Internet protocol (IP) address to the WiFi Direct device serving as a client by using a dynamic host configuration protocol (DHCP) server in operation 208, such that P2P connection between the WiFi Direct devices is completed.

The foregoing description is of a basic procedure to connect WiFi Direct devices, and hereinafter, each connection operation and the characteristics of the WiFi Direct technique will be described in detail with reference to the accompanying drawings.

Figure 3:
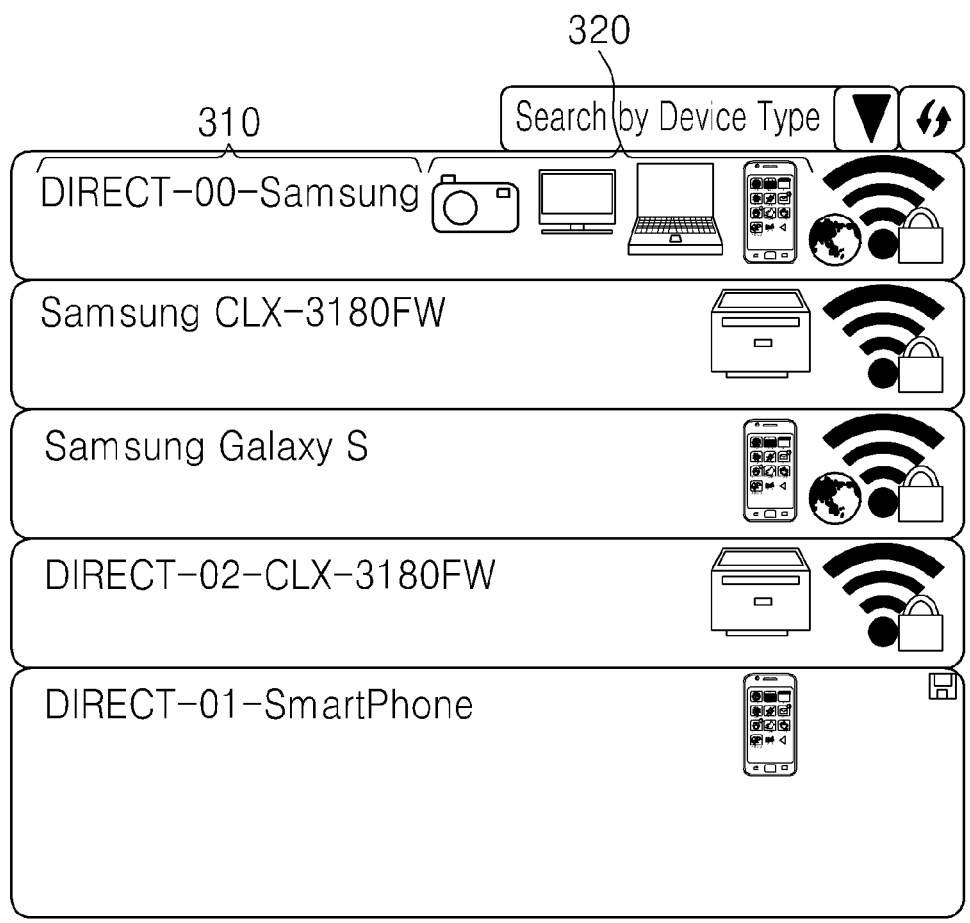
FIG. 3 is a diagram illustrating an example in which a list of WiFi Direct devices discovered as a result of device discovery in a device supporting WiFi Direct is displayed.

FIG. 3 is a diagram illustrating an example in which a list of WiFi Direct devices discovered as a result of device discovery in a WiFi Direct device is displayed. Once the WiFi Direct device performs device discovery, the WiFi Direct device exchanges device information such as device type, service set identifier (SSID), etc., with the discovered WiFi Direct devices through a probe request and a probe response, which are WLAN packets, and displays collected information.

As illustrated in FIG. 3, SSIDs and device types of the discovered WiFi Direct devices are displayed in the form of text 310 or icons 320. The discovered devices all may be shown in the list, but they may be filtered by device type to display only devices of a desired type. The WiFi Direct technique classifies and defines device types on a category basis. The device types may be classified into categories such as a computer, an input device, a printer, a scanner, a facsimile, a duplicating machine, a camera, etc., and each category may be classified into sub-categories. For example, the computer category may be classified into sub-categories such as a PC, a server, a laptop computer, etc.

Figure 4:
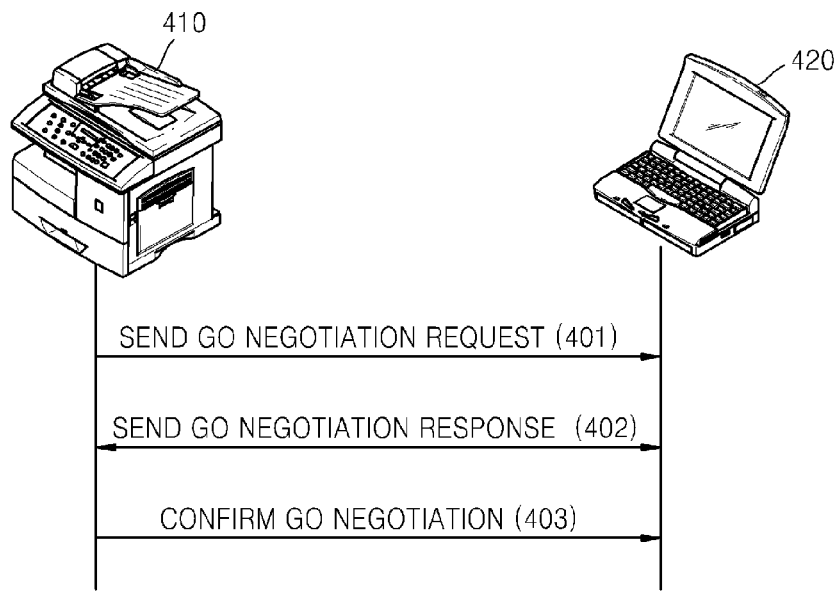
FIG. 4 is a detailed diagram illustrating a group formation procedure during a connection procedure between devices supporting WiFi Direct.

FIG. 4 is a detailed diagram illustrating the group formation procedure during a connection procedure between WiFi Direct devices. The group formation procedure refers to determining which WiFi Direct devices are connected to form a network and which WiFi Direct device is to serve as a GO or a client. For example, once a WiFi Direct complex machine 410 performs device discovery, selects a notebook PC 420 among discovered WiFi Direct devices, and attempts connection to the notebook PC 420, the complex machine 410 sends a GO negotiation request to the notebook PC 420 in operation 401.

The notebook PC 420 having received the GO negotiation request compares its intensity value with an intensity value of the complex machine 410, such that it determines the complex machine 410 to be a GO if the intensity value of the complex machine 410 is larger. Otherwise, if the intensity value of the notebook PC 420 is larger than that of the complex machine 410, the notebook PC 420 determines itself to be a GO. The intensity value refers to a value that indicates an intensity of tasks of each device and is determined by a manufacturer's policy and user settings. For example, a device that is supplied with power at all times, such as a complex machine, may be set to have a relatively high intensity value. As such, once the intensity values are compared to determine which device is to be a GO, the notebook PC 420 sends the result to the complex machine 410 as a GO negotiation response in operation 402. The complex machine 410 having received the GO negotiation response performs a GO negotiation confirmation that sends received GO negotiation information back to the notebook PC 420 to confirm accurate reception of the GO negotiation information, in operation 403, thus terminating the group formation procedure. Upon completion of the group formation procedure, the WiFi Direct device, which is the GO, manages security information and SSIDs of devices included in the group.

Figure 5:
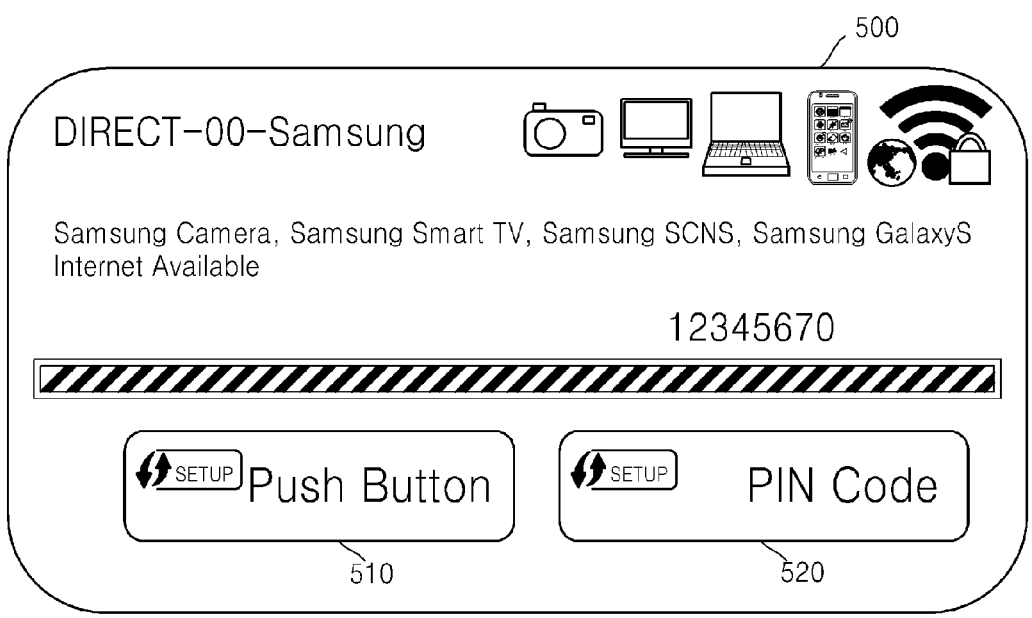
FIG. 5 is a diagram illustrating a display screen to execute a WiFi Protected Setup (WPS)

Once group formation is completed, the WiFi Direct devices included in the group are security-connected through WPS. FIG. 5 is a diagram illustrating a display screen 500 to execute the WPS. The display screen 500 as illustrated in FIG. 5 may be displayed on a display unit of the WiFi Direct complex machine 410 of FIG. 4. Referring to FIG. 5, a user may select a WPS button 510 or a PIN code 520 to execute WPS. When WPS is executed using the WPS button 510, once the user presses the WPS button 510 in the complex machine 410 and, within a predetermined time thereafter, presses a WPS button in a device to be connected, then security information is automatically exchanged between those devices and security connection is made. In this case, when the device serving as a GO provides the security information, the device serving as a client receives the provided security information. Also, in this case, security connection is made through encryption based on a WPA2-PSK authentication scheme, such that strong security performance is provided.

Figure 6:
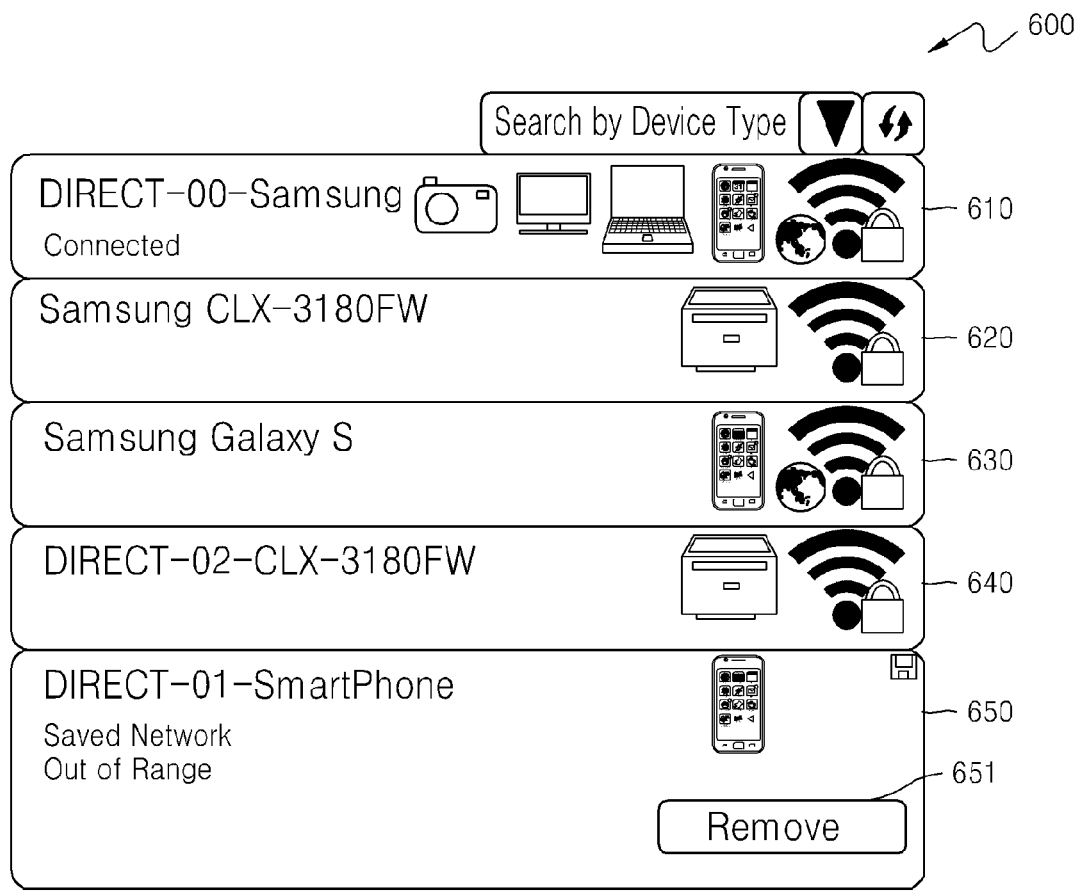
FIG. 6 is a diagram illustrating an example in which a list of devices supporting WiFi Direct whose information is stored according to a profile storage function is displayed.

WiFi Direct devices have a profile storage function that stores information of previously-connected WiFi Direct devices. FIG. 6 is a diagram illustrating an example in which a list of WiFi Direct devices whose information is stored according to a profile storage function. Assuming that a display screen 600 is displayed on the display unit of a WiFi Direct complex machine 410, information of a first list 610 indicates devices that are currently wirelessly connected to the complex machine 410, information of second through fourth lists 620 through 640 indicate devices that are not currently connected to the complex machine 410, but are in a device discovery range of the complex machine 410, and information of a fifth list 650 indicates a device that has been previously connected to the complex machine 410, but is not currently discovered. If the information of the fifth list 650 is not required, the user may remove the fifth list 650 by pressing a remove button 651. The WiFi Direct device has the profile storage function, such that the WiFi Direct device stores information of a once-connected device, and when the same device attempts connection again, the WiFi Direct device may perform connection rapidly by using the stored information without WPS execution.

Figure 7:
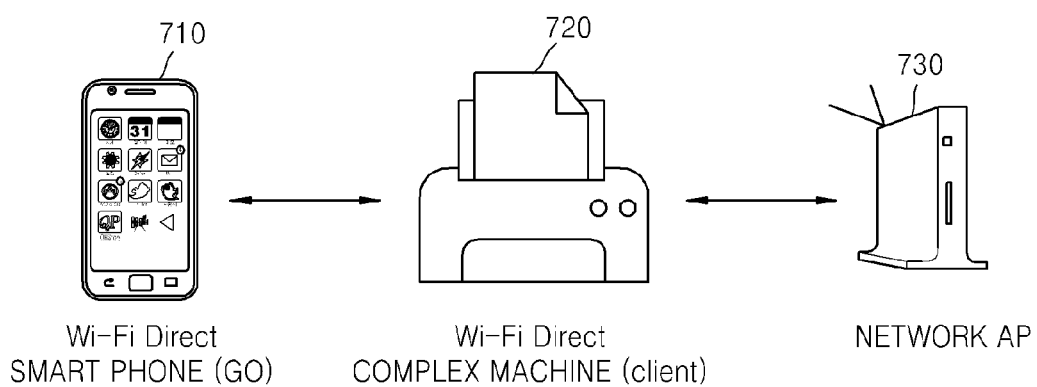
FIG. 7 is a diagram illustrating devices supporting WiFi Direct, which are connected simultaneously.

The WiFi Direct device may be connected to a network, and at the same time, may also be P2P-connected with another WiFi Direct device, which is referred to as cross connection. FIG. 7 is a diagram illustrating WiFi Direct devices that are cross-connected. Referring to FIG. 7, a WiFi Direct complex machine 720 is P2P-connected with another WiFi Direct device, a smart phone 710, and at the same time, is connected to an AP 730 of a network. The complex machine 720, because of being P2P-connected to the smart phone 710, may transmit and receive direct print data, etc., to and from the smart phone 710, and at the same time, may transmit and receive direct print data, etc., to and from the network through the AP 730 of the network.

When the WiFi Direct device is cross-connected as illustrated in FIG. 7, or when the WiFi Direct device is connected in a wired manner to a network and at the same time, is P2P-connected with another WiFi Direct device, different IP addresses and Medium Access Control (MAC) addresses may be used to perform the respective connections, that is, the connection to the network and the connection to the WiFi Direct device. With such a multi-homing technique, the WiFi Direct device may support different services corresponding to respective interfaces that are cross-connected. For example, a service corresponding to all functions of a complex machine 720 is supported through an interface connected to the network 730, but a service having limited functions is supported through an interface connected to another WiFi Direct device.

Figure 8:
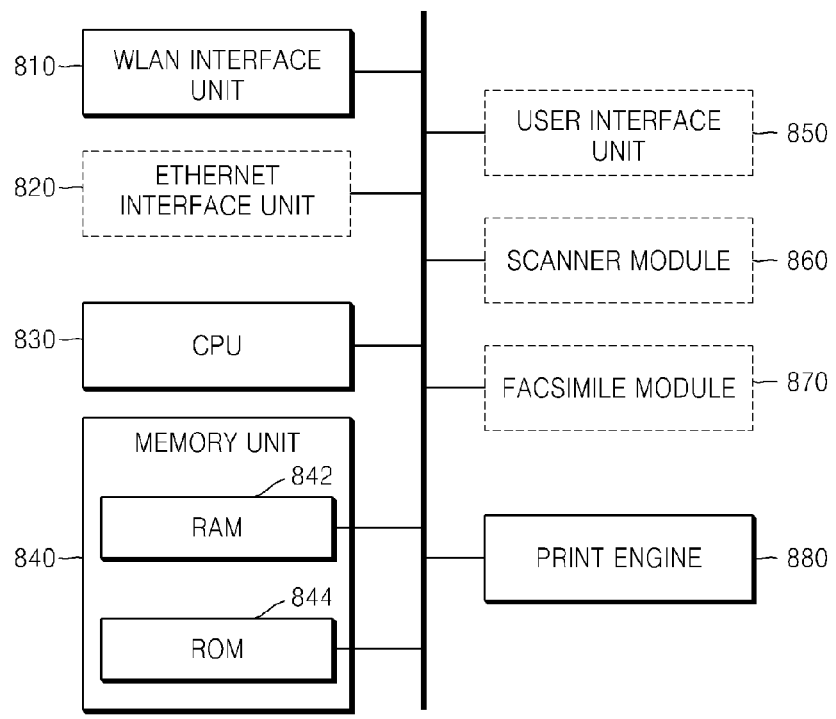
FIG. 8 is a block diagram of a basic hardware structure of a complex machine supporting WiFi Direct.

FIG. 8 is a block diagram of a basic hardware structure of a complex machine supporting WiFi Direct. Referring to FIG. 8, a WiFi Direct complex machine may include a WLAN interface module 810, an Ethernet interface module 820, a central processing unit (CPU) 830, a memory unit 840, a user interface module 850, a scanner module 860, a facsimile module 870, and a print engine 880. The memory unit 840 may include a random access memory (RAM) 842 and a read only memory (ROM) 844. If the complex machine supports only WLAN, it may not include the Ethernet interface module 820. If the complex machine is only a printer, it may not include the scanner module 860 and the facsimile module 870.

The WLAN interface module 810 refers to hardware that executes an IEEE 802.11 b/g/n function, and may communicate with a complex machine's main board on which the CPU 830 is mounted through a universal serial bus (USB). The Ethernet interface module 820 refers to hardware that performs wired Ethernet communication according to the IEEE 802.3. The CPU 830 controls overall operations of the complex machine, and information and print data necessary to perform control operations are stored in the memory unit 840 and are read from the memory unit 840 when necessary.

The user interface module 850 is hardware that serves as a medium to allow a user to check information of the complex machine and input a command to the complex machine. The user interface module 850 may be configured variously according to products, such that it may be simply configured in the form of two or four lines on a display unit such as an LCD or a light emitting diode (LED), or may be configured as a graphic user interface (GUI) to allow various graphic representations. The scanner module 860, the facsimile module 870, and the print engine 880 represent hardware to perform a scan function, a facsimile function, and a print function, respectively.

Figure 9:
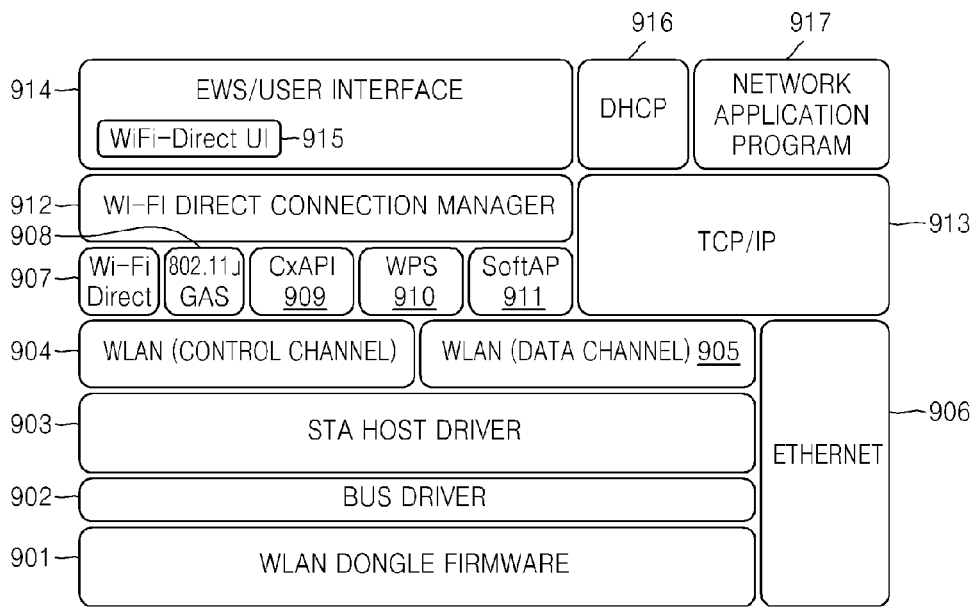
FIG. 9 is a block diagram of a basic software configuration of a complex machine supporting WiFi Direct.

FIG. 9 is a block diagram of a basic software configuration of a complex machine supporting WiFi Direct. Each element of the software of the complex machine that supports WiFi Direct will be described in brief with reference to FIG. 9.

WLAN dongle firmware 901 is firmware to perform a WLAN connection, and may be stored in WLAN dongle hardware or may be transmitted to WLAN dongle hardware from the main board of the complex machine during booting. A bus driver 902 and a station (STA) host driver 903 are low-level bus drivers to perform communication with WLAN hardware. A WLAN control channel 904 and a WLAN data channel 905 are channels to perform communication with WLAN firmware. A WiFi Direct Module 907 is a module to perform WiFi Direct connection and issuing an operation command to the WLAN dongle firmware 901.

An IEEE 802.11u generic advertisement service (GAS) module 908 performs an IEEE 802.11u GAS function, and a WPS module 910 performs a WPS function. A soft AP module 911 is a software module to allow the complex machine to serve as an AP. A transmission control protocol (TCP)/IP 913 is a standard protocol to perform a network transmission. A WiFi Direct connection manager 912 is a module to perform control related to WiFi Direct connection. A WiFi Direct user interface 915 allows the user to perform setup related to WiFi Direct and may be included in a user interface 914 installed in an embedded web server (EWS). A dynamic host configuration protocol (DHCP) server 916 automatically allocates an IP to a WiFi Direct device connected as a client. A network application program 917 allows various application operations related to a network.

Hereinafter, an image forming apparatus that supports WiFi Direct and a method of controlling Internet access of the image forming apparatus will be described in detail with reference to FIGS. 10A through 19.

Figure 10A:
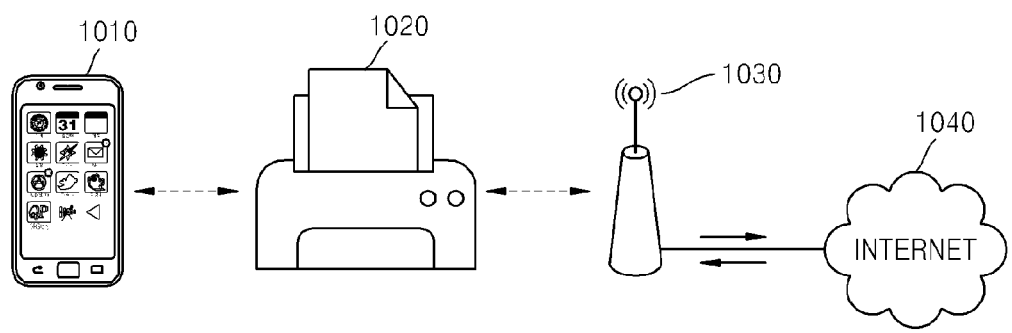
FIGS. 10A and 10B are diagrams illustrating examples in which an image forming apparatus supporting WiFi Direct is cross-connected to a wireless terminal and the Internet.
Figure 10B:
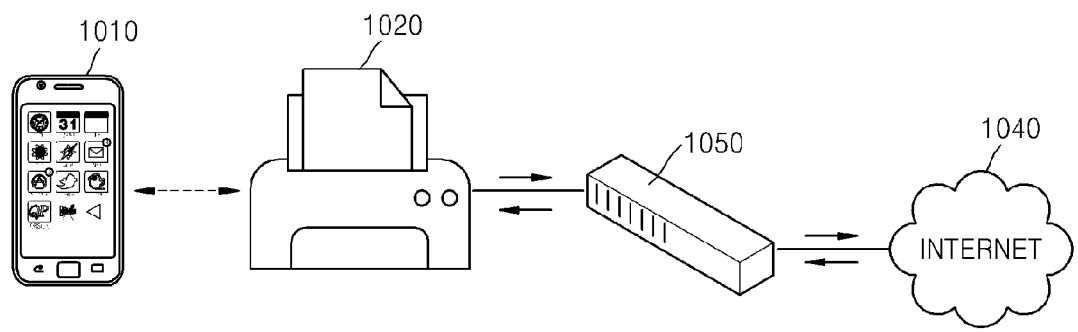

FIGS. 10A and 10B are diagrams illustrating examples in which an image forming apparatus supporting WiFi Direct is cross-connected to a wireless terminal and the Internet. As described previously with reference to FIG. 7, an image forming apparatus that supports WiFi Direct may be WiFi-Direct connected to the wireless terminal that supports WiFi Direct and at the same time, may be connected to the Internet. Referring to FIG. 10A, when an image forming apparatus 1020 that supports WiFi Direct supports a WLAN interface, it is wirelessly connected to an AP 1030 connected to an Internet 1040 and at the same time, may also be WiFi-Direct connected with a wireless terminal 1010 that supports WiFi Direct. Referring to FIG. 10B, when the image forming apparatus 1020 that supports WiFi Direct supports a wired LAN interface, it is connected to a router 1050 connected to the Internet 1040 in a wired manner, and at the same time, may be WiFi-Direct connected with the wireless terminal 1010 that supports WiFi Direct.

When the image forming apparatus 1020 operates as a GO in FIGS. 10A and 10B, the image forming apparatus 1020 may relay Internet access of the wireless terminal 1010 such that the wireless terminal 1010 accesses the Internet through the image forming apparatus 1020. For example, the wireless terminal 1010, when desiring to access the Internet through the image forming apparatus 1020, sends a data packet destined to a server in the Internet to the image forming apparatus 1020. Since the wireless terminal 1010 has previously been WiFi-Direct connected with the image forming apparatus 1020, it may wirelessly send the data packet to the image forming apparatus 1020. The image forming apparatus 1020 then performs network address translation (NAT) to translate a network address included in the packet received from the wireless terminal 1010, and sends the packet to the AP 1030 or the router 1050 to allow the packet to be sent to the destined server in the Internet.

When the wireless terminal 1010 accesses the Internet through the image forming apparatus 1020, the image forming apparatus 1020 has to relay the packet between the wireless terminal 1010 and the Internet network, causing heavy load on the image forming apparatus 1020, such that the image forming apparatus 1020 may be disturbed in performing its unique function, image formation, and may be affected in terms of performance. In particular, this problem becomes worse when the wireless terminal 1010 performs an operation using a large amount of data, such as downloading of a large-volume file.

Therefore, in the following exemplary embodiments of the present general inventive concept, when a wireless terminal which is WiFi-Direct connected to an image forming apparatus request Internet access through the image forming apparatus, the image forming apparatus determines whether to permit or prohibit Internet access according to a predetermined criterion, rather than permitting Internet access at all times, and permits or prohibits Internet access according to the determination result, thereby solving the foregoing problem and efficiently using resources of the image forming apparatus.

Figure 11:
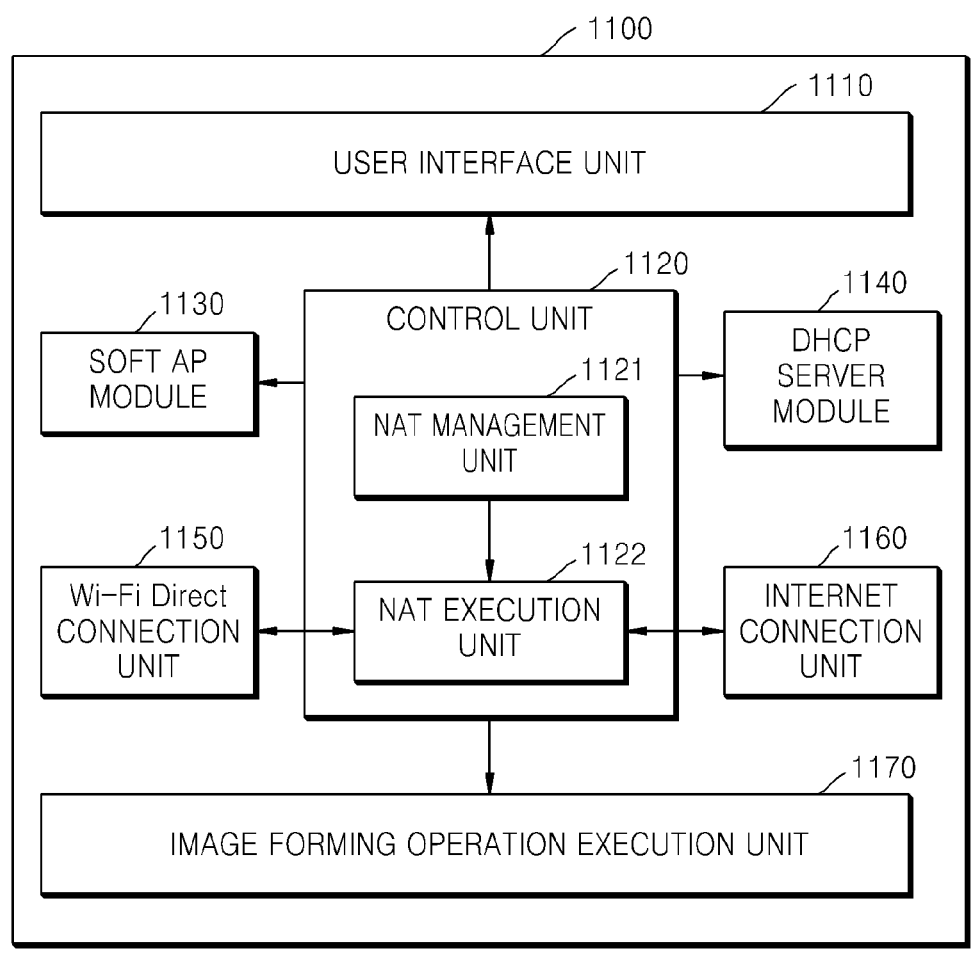
FIG. 11 is a block diagram illustrating a structure of an image forming apparatus according to an exemplary embodiment of the present general inventive concept.

FIG. 11 is a block diagram of an image forming apparatus 1100 according to an exemplary embodiment of the present general inventive concept. Referring to FIG. 11, the image forming apparatus 1100 according to an exemplary embodiment of the present general inventive concept may include a user interface unit 1110, a control unit 1120, a soft AP module 1130, a DHCP server module 1140, a WiFi Direct connection unit 150, an Internet connection unit 1160, and an image forming operation execution unit 1170. The control unit 1120 may include a NAT management unit 1121 and a NAT execution unit 1122.

The user interface unit 1110 may receive various commands from a user. For example, the user interface unit 1110 may receive a command instructing an execution of an image formation operation or a command corresponding to various settings of the image forming apparatus 1100. In the current exemplary embodiment, settings of whether to permit or prohibit Internet access of the WiFi-Direct connected wireless terminal may be input.

Once the image forming apparatus 1100 operates, the control unit 1120 drives the soft AP module 1130 to operate as an AP, such that the image forming apparatus 1100 serves as a GO at all times. If an external wireless terminal requests WiFi Direct connection from the image forming apparatus 1100, the control unit 1120 drives the DHCP server module 1140 to allocate a network address including an IP address, a gateway address, a subnet mask, and a domain name system (DNS) server address to the wireless terminal.

The control unit 1120 may control the DHCP server module 1140 to allocate a gateway address of a different value to the wireless terminal according to whether to permit or prohibit Internet access of the wireless terminal connected to the image forming apparatus 1100. More specifically, if Internet access of the wireless terminal is permitted, the control unit 1120 allocates a WiFi Direct interface IP address of the image forming apparatus 1100 to a gateway address of the wireless terminal. Otherwise, if Internet access of the wireless terminal is prohibited, the control unit 1120 may not allocate the gateway address of the wireless terminal or may allocate a null value such as 0.0.0.0 to the wireless terminal.

The control unit 1120 determines whether to permit or prohibit Internet access of the wireless terminal that is WiFi-Direct connected through the WiFi Direct connection unit 1150 if there is an Internet access request from the wireless terminal, and executes a corresponding operation according to the determination result. More specifically, upon receiving a data packet destined to a server in the Internet from the wireless terminal connected by the WiFi Direct connection unit 1150, the NAT execution unit 1122 included in the control unit 1120 translates a network address included in the data packet and forwards the translated network address to the Internet connection unit 1160 to allow the data packet to be sent to the destined server. More specifically, the NAT execution unit 1122 translates a source IP address included in the data packet into an IP address of the image forming apparatus 1100. The NAT management unit 1121 included in the control unit 1120 may control the NAT execution unit 1122 to perform NAT only when a predetermined condition is satisfied, rather than for every received packet.

Last, the image forming operation execution unit 1170 may perform image formation such as printing or scanning, under control of the control unit 1120.

Hereinafter, exemplary embodiments of controlling Internet access in the image forming apparatus 1100 of FIG. 11 will be described in detail.

First, whether to permit or prohibit Internet access may be determined according to a device type of a WiFi-Direct connected wireless terminal. Once the image forming apparatus 1100 is WiFi-Direct connected with an external wireless terminal, the image forming apparatus 1100 receives device information from the wireless terminal and thus may identify a device type of the wireless terminal. More specifically, the image forming apparatus 1100 may recognize which category among WiFi Direct device type categories the wireless terminal corresponds to, such that if the wireless terminal corresponds to a device type that is highly likely to perform an operation of downloading a large-volume file, such as a computer or multimedia device type, then the image forming apparatus 1100 prohibits Internet access of the wireless terminal, thus reducing a load imposed to the image forming apparatus 1100. Therefore, device types belonging to WiFi Direct device type categories are classified into Internet-access-permitted device types and Internet-access-prohibited device types, and such classification is stored in a database, such that when the wireless terminal is WiFi-Direct connected or requests Internet access, the image forming apparatus 1100 refers to the database to determine whether to permit or prohibit Internet access.

If the identified device type corresponds to an Internet-access-prohibited device type, Internet access may be prohibited in the following two ways. First, the control unit 1120 may control the DHCP module 1140 to allocate no gateway address or a null value such as 0.0.0.0 to the wireless terminal. Alternatively, if receiving a data packet destined to a server in the Internet from the wireless terminal, the NAT management unit 1121 may control the NAT execution unit 1122 not to perform NAT with respect to the received packet and may not transmit the received packet to the destined server.

Second, whether to permit or prohibit Internet access may be determined according to a current operating state of the image forming apparatus 1100. If the image forming apparatus 1100 is executing a particular operation such as printing, Internet access may be prohibited to facilitate smooth execution of the printing operation. Thus, if receiving a data packet destined to a server in the Internet from the wireless terminal connected through the WiFi Direct connection unit 1150, the control unit 1120 checks a current operating state of the image forming apparatus 1100, such that if the checked operating state is an operating state in which Internet access is permitted, then the network address of the received packet is translated and sent to the destined server. Otherwise, if the checked operating state is an operating state in which Internet access is prohibited, then NAT is not performed with respect to the received packet and the received packet is not sent to the destined server.

Third, whether to permit or prohibit Internet access may be determined according to whether an Internet access request of a wireless terminal is necessary to execute a printing function of the image forming apparatus 1100. If the wireless terminal is WiFi-Direct connected to the image forming apparatus 1100, the wireless terminal may execute a mobile printing function of executing a printing operation by sending a print command or print data to the image forming apparatus 1100 through WiFi Direct connection. In this case, an image file such as a picture stored in the wireless terminal may be printed and by accessing a web server in the Internet, an image file stored in the server may also be printed.

Figure 12:
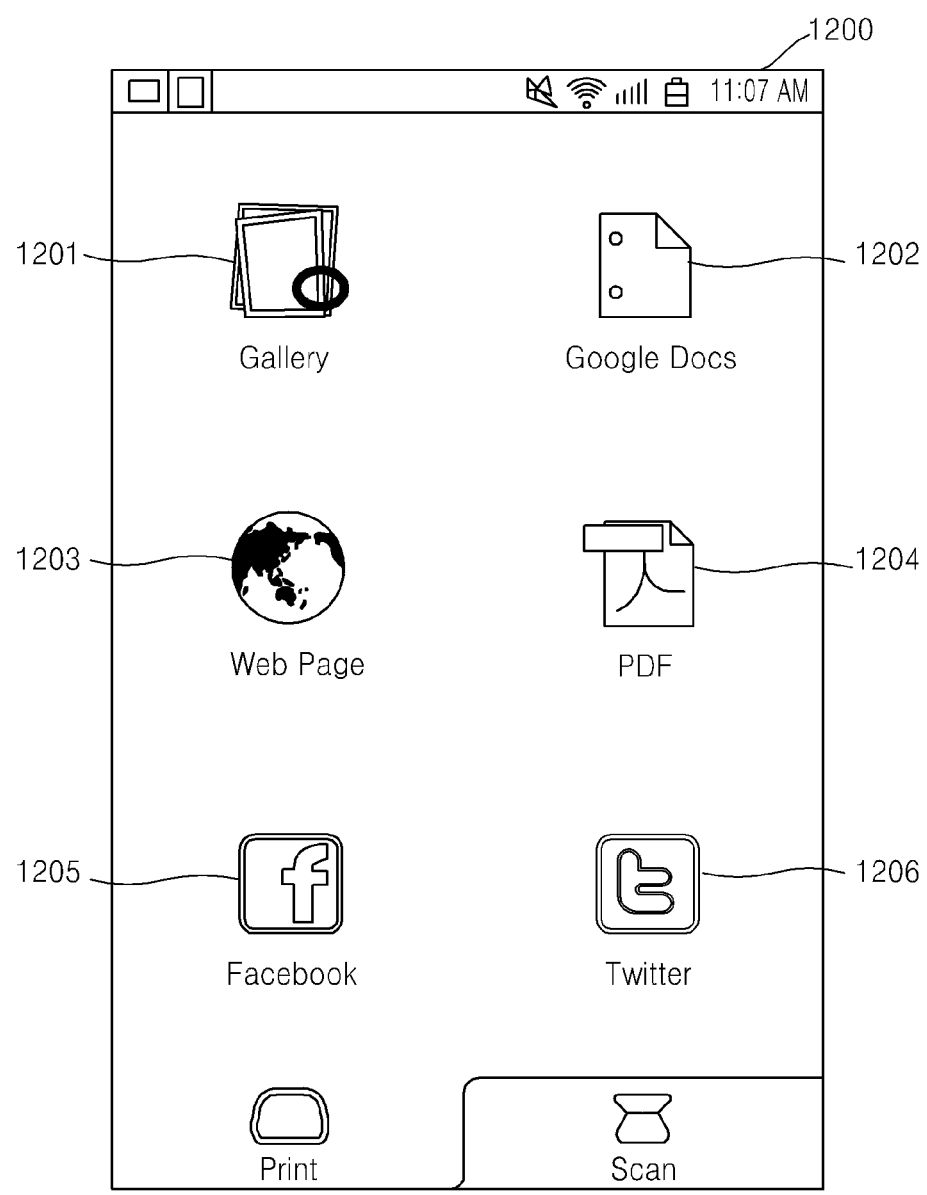
FIG. 12 is a diagram illustrating a screen displayed on a wireless terminal when a mobile printing function is used.

For example, a web page such as GOOGLE DOCS, FACEBOOK, or TWITTER may be accessed to print an image file on the web page. FIG. 12 illustrates a screen 1200 displayed on the wireless terminal when the mobile printing function is used. Referring to FIG. 12, once an item "Gallery" 1201 or "PDF" 1204 is selected from a menu displayed on the screen 1200 in execution of the mobile printing function, then a picture of a PDF file stored in the wireless terminal is printed; if an item "Google Docs" 1202, "Web Page" 1203, "Facebook" 1205 or "Twitter" 1206 is selected, then the corresponding web page is accessed and an image selected from the web page by the user is printed.

In the current exemplary embodiment, if Internet access is necessary to execute the printing function, Internet access is permitted. Otherwise, Internet access is prohibited. More specifically, upon receiving a data packet destined to the server in the Internet from the wireless terminal connected through the WiFi Direct connection unit 1150, the control unit 1120 checks a network port included in the received packet and determines based on the checked network port whether the received packet is a packet to execute the printing function. If the control unit 1120 determines that the packet is a packet to execute the printing function, the network address of the received packet is translated and sent to the destined server. Otherwise, if the control unit 1120 determines that the packet is not the packet to execute the printing function, NAT is not performed with respect to the received packet and the received packet is not sent to the destined server.

Figure 13:
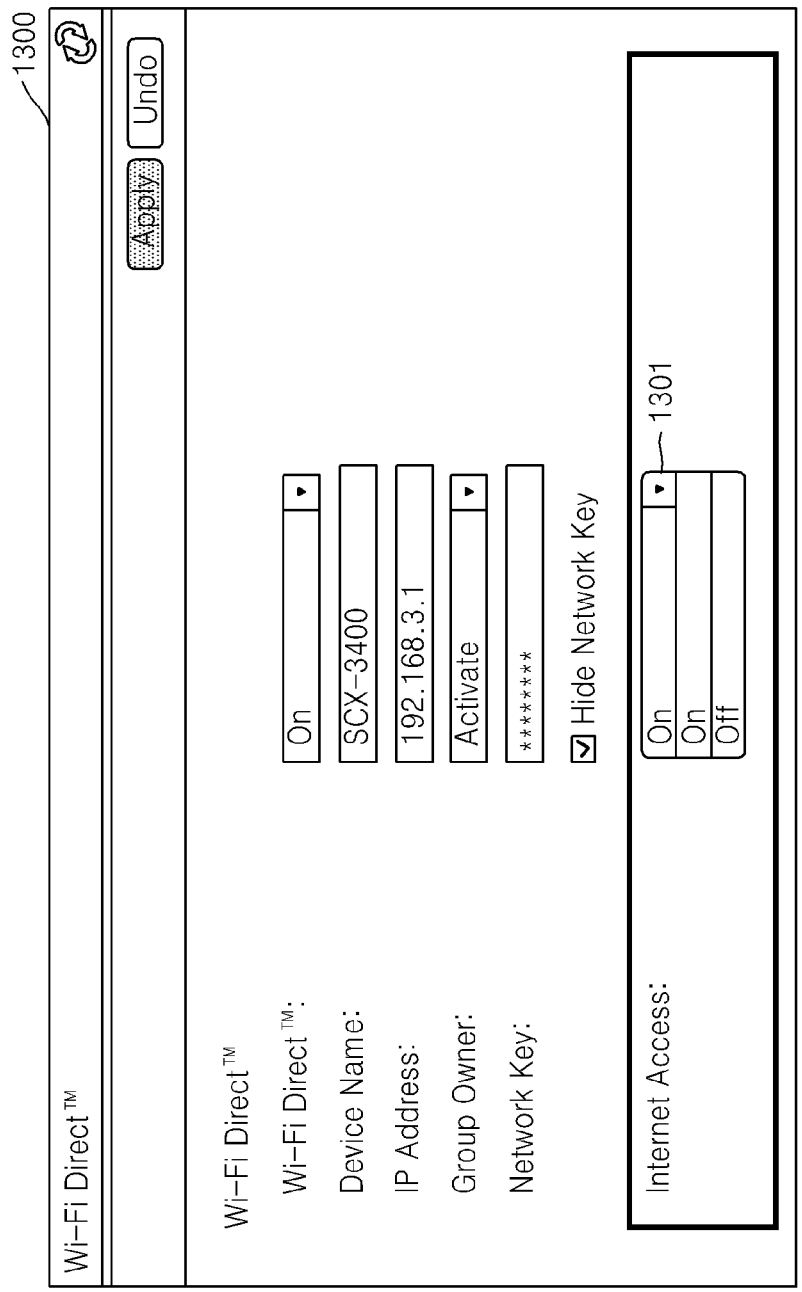
FIG. 13 is a diagram illustrating a screen to set whether to permit or prohibit Internet access through an image forming apparatus that is WiFi-Direct connected to a wireless terminal.

Last, whether to permit or prohibit Internet access may be determined according to user settings. The user may previously set whether to permit or prohibit Internet access through the image forming apparatus 1100 corresponding to wireless terminals that are WiFi-Direct connected to the image forming apparatus 1100 through the user interface unit 1110. FIG. 13 is a diagram illustrating a screen 1300 to set whether to permit or prohibit Internet access through the image forming apparatus 1100 corresponding to a wireless terminal that is WiFi-Direct connected. On the screen 1300, a region 1301 to perform an on/off setting with respect to Internet access is displayed. The user may set 'on' or 'off' on this region 1301 to permit or prohibit Internet access of the wireless terminal.

If Internet access of the wireless terminal is set to be prohibited, Internet access may be prohibited in the following two ways. First, the control unit 1120 may control the DHCP module 1140 to allocate no gateway address or a null value such as 0.0.0.0 to the wireless terminal. Alternatively, upon receiving a data packet destined to the server in the Internet from the wireless terminal, the NAT management unit 1121 may control the NAT execution unit 1122 not to perform NAT with respect to the received packet and may not send the received packet to the destined server.

As such, when the wireless terminal that is WiFi-Direct connected to the image forming apparatus 1100 requests Internet access through the image forming apparatus 1100, the image forming apparatus 1100 determines whether to permit or prohibit Internet access according to a predetermined criterion and permits or prohibits Internet access according to the determination result, rather than permitting Internet access at all times, thereby efficiently using resources of the image forming apparatus 1100.

FIGS. 14 through 19 are flowcharts illustrating a method of controlling Internet access in an image forming apparatus that supports WiFi Direct according to other exemplary embodiments of the present general inventive concept.

Figure 14:
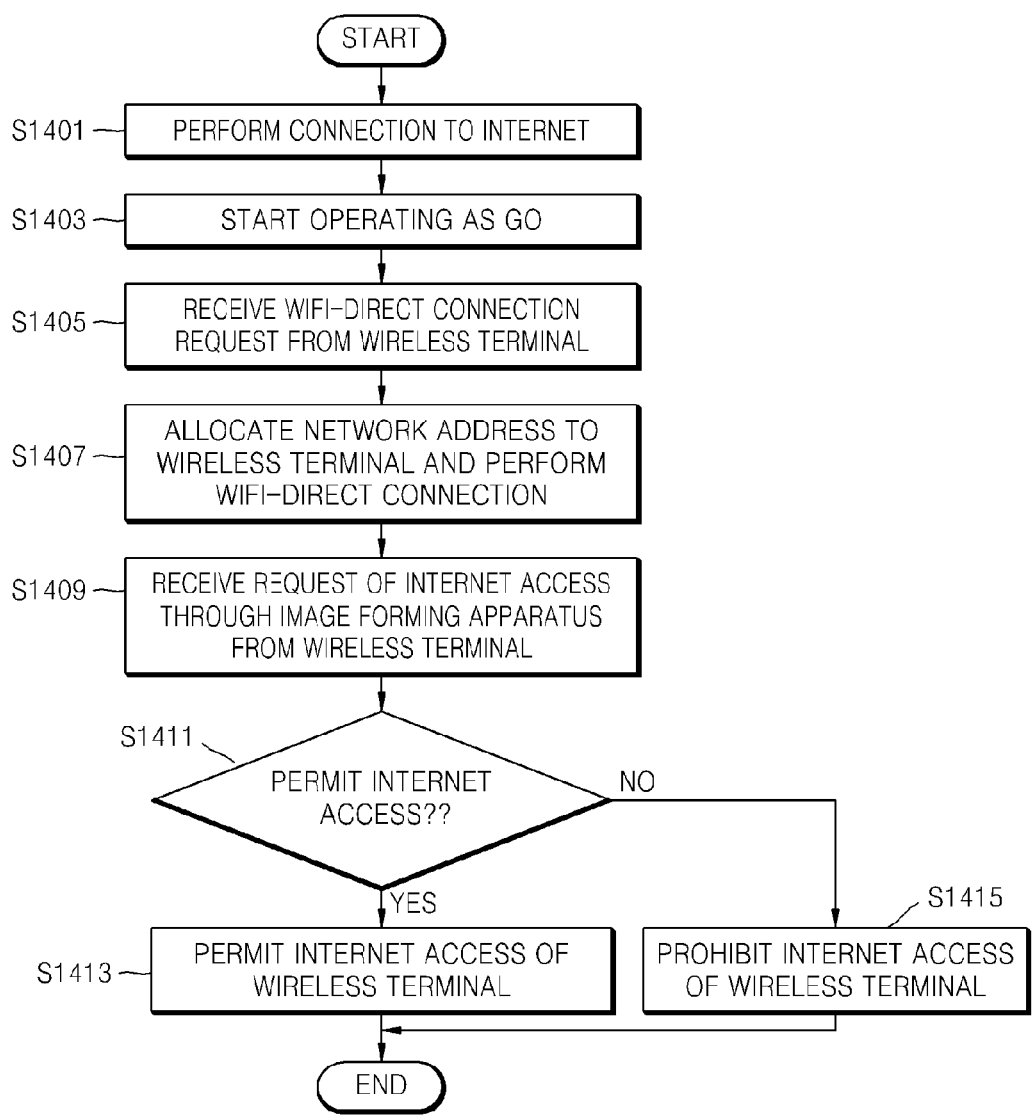
FIGS. 14 through 19 are flowcharts illustrating a method of controlling Internet access in an image forming apparatus that supports WiFi Direct according to other exemplary embodiments of the present general inventive concept.

Referring to FIG. 14, the image forming apparatus is connected to the Internet in operation S1401, and starts operating as a GO in operation S1403. The image forming apparatus operating as a GO, upon receiving a WiFi Direct connection request from an external wireless terminal in operation S1405, allocates a network address including an IP address, a gateway address, a subnet mask, and a DNS server address to the wireless terminal and completes WiFi Direct connection with the wireless terminal in operation S1407.

Upon receiving a request to perform Internet access through the image forming apparatus from the wireless terminal in operation S1409, the image forming apparatus determines whether to permit or prohibit Internet access in operation S1411. If determining to permit Internet access, the image forming apparatus permits Internet access of the wireless terminal in operation S1413; if determining to prohibit Internet access, the image forming apparatus prohibits Internet access of the wireless terminal in operation S1415.

Figure 15:
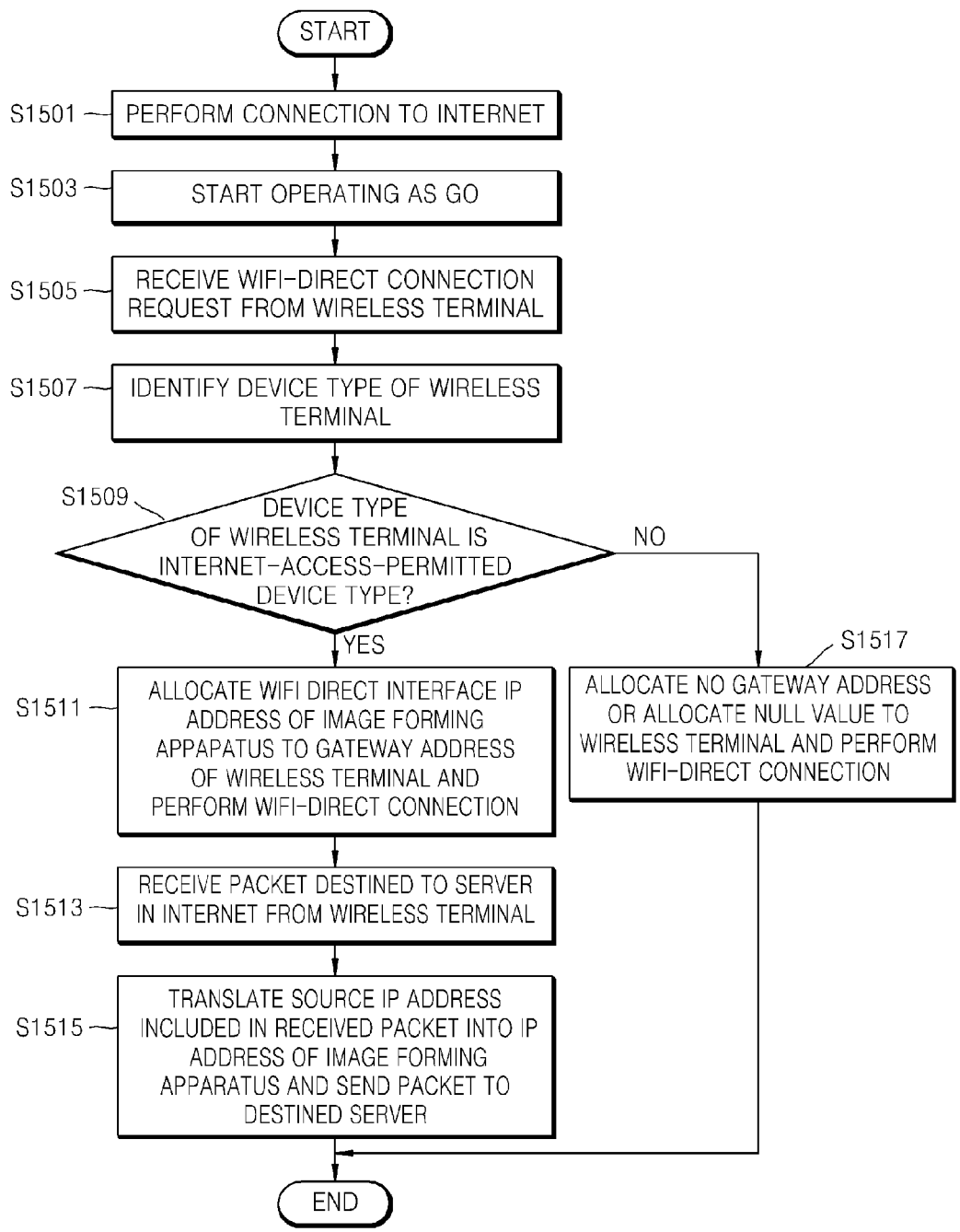
Figure 16:
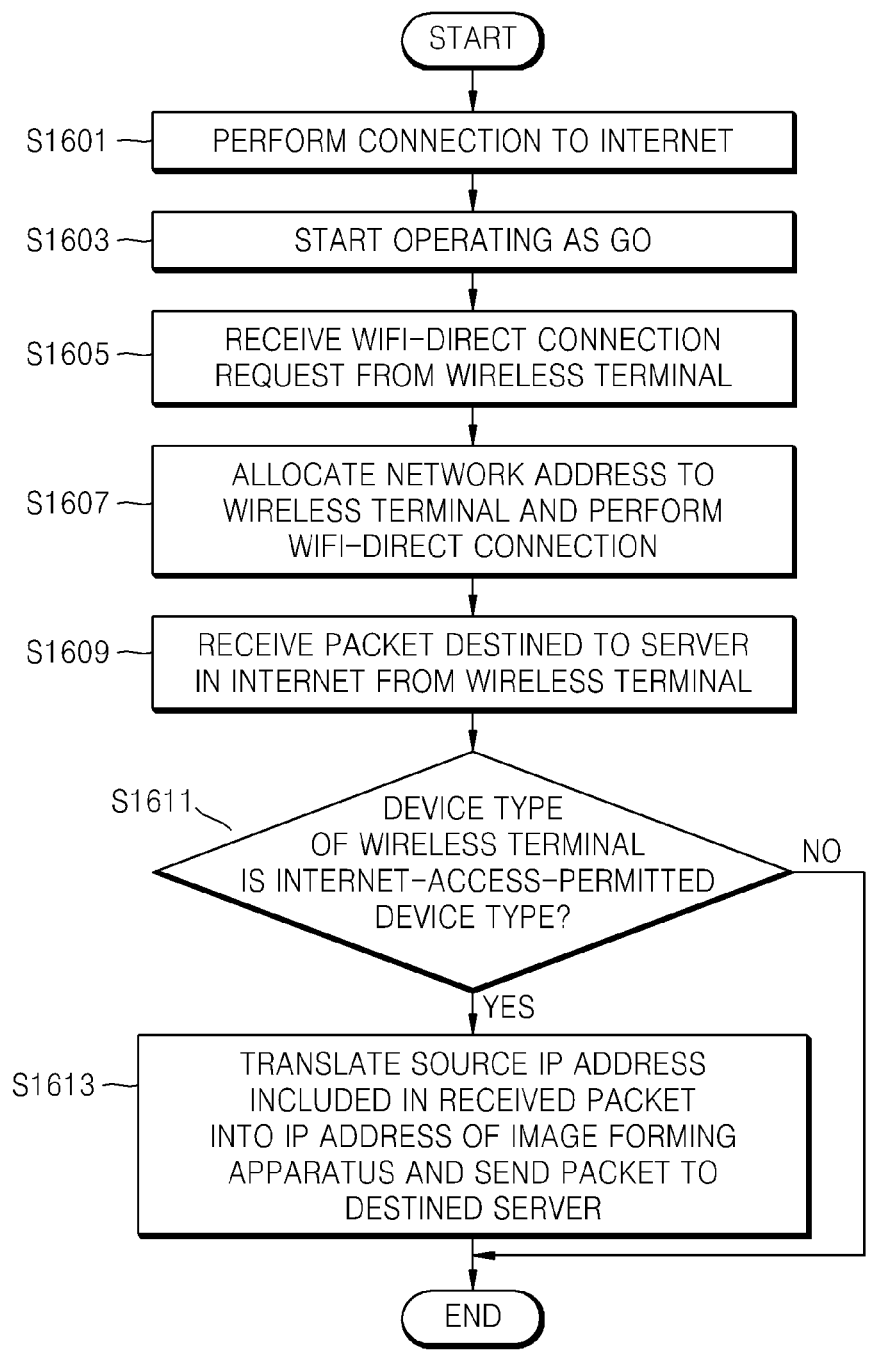
Figure 17:
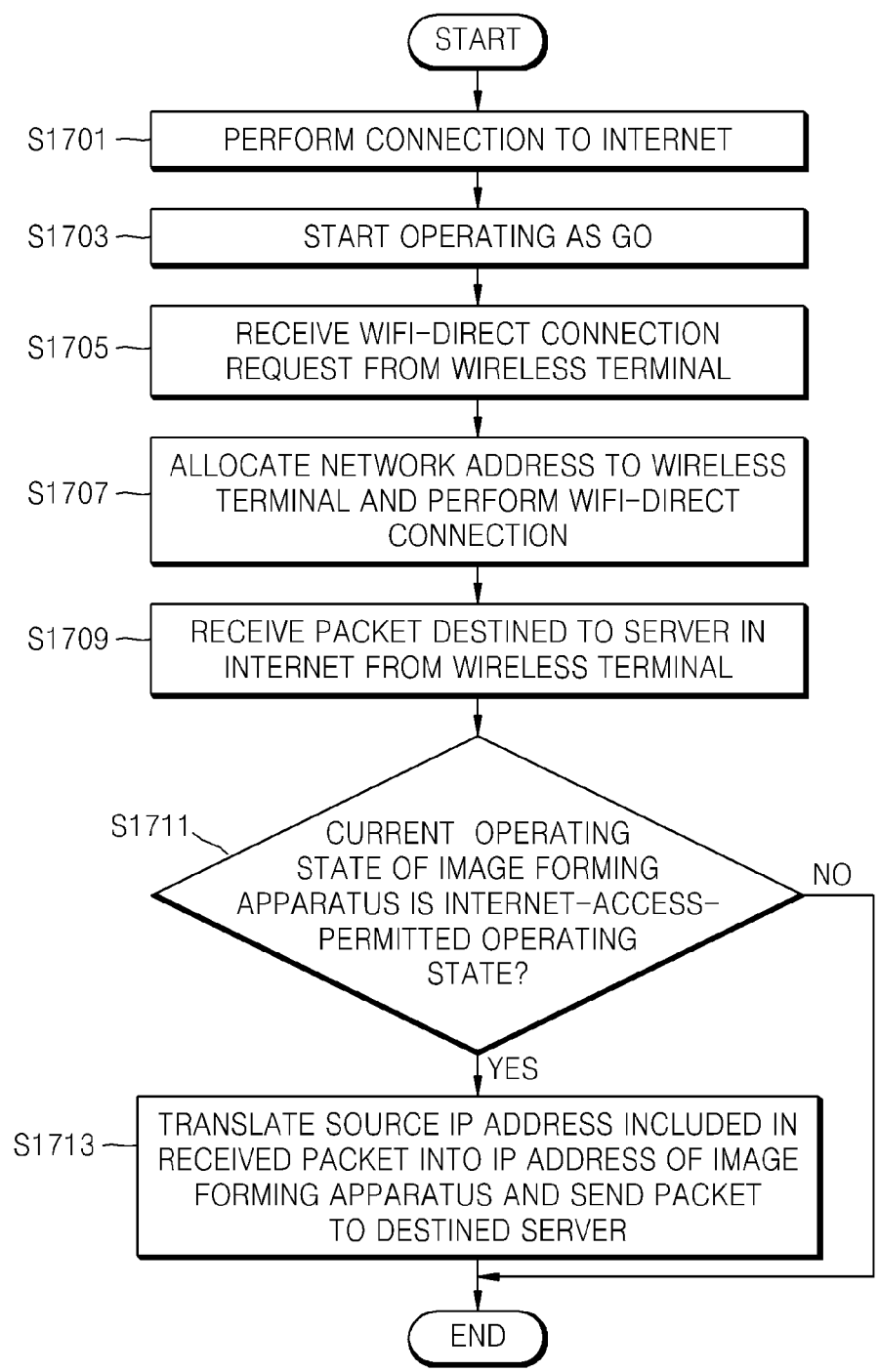
Figure 18:
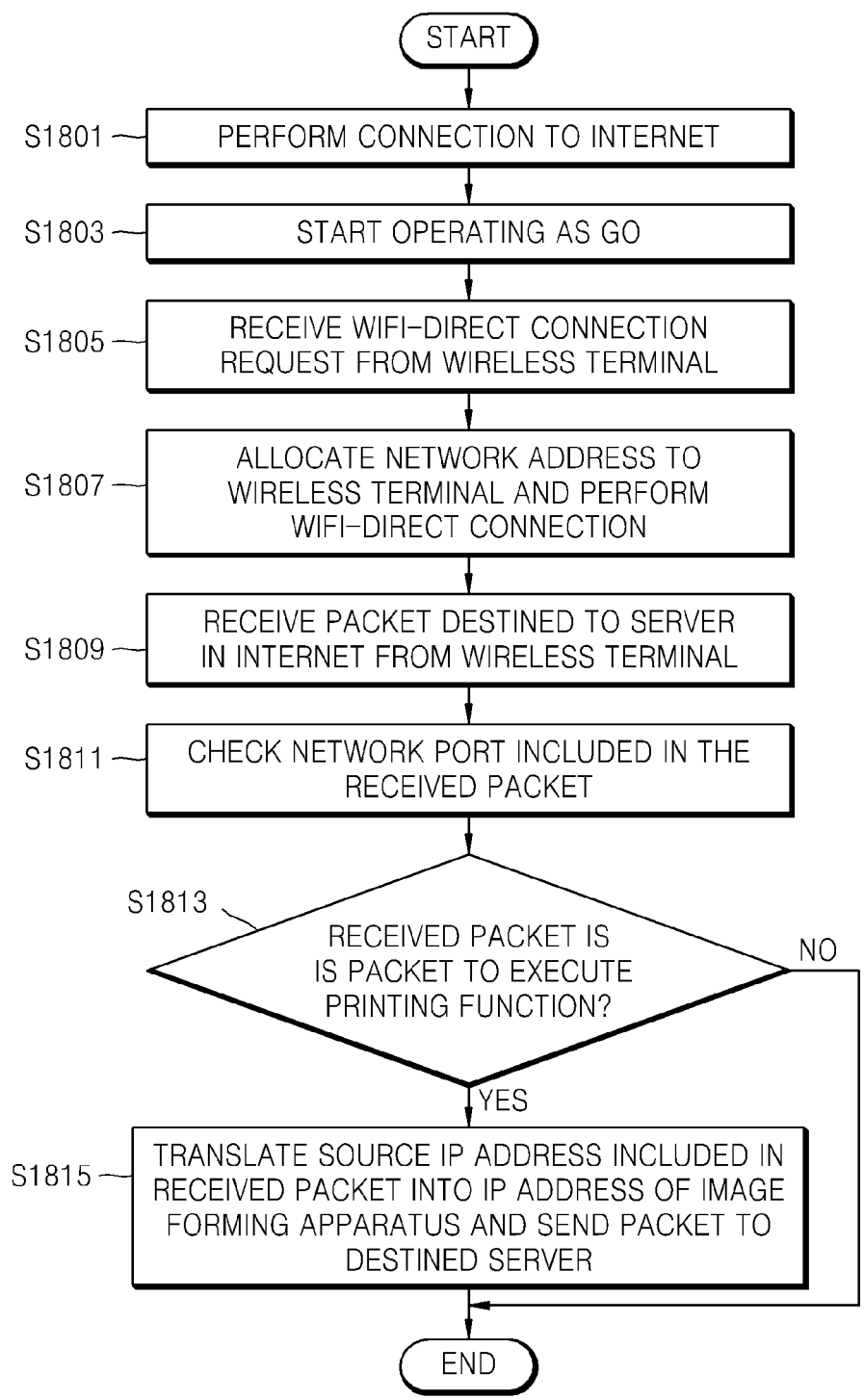
Figure 19:
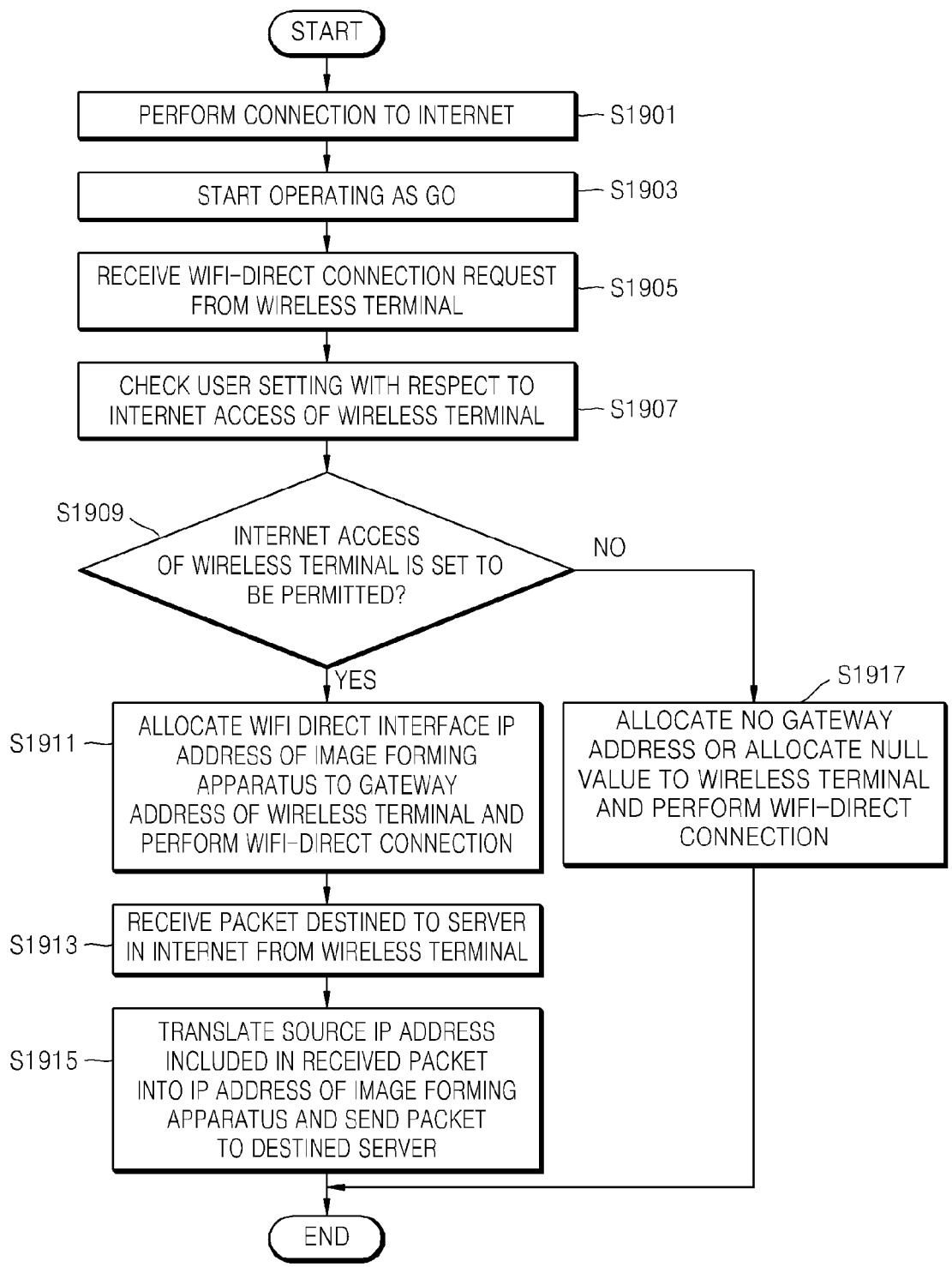

FIGS. 15 through 19 illustrate detailed embodiments. FIGS. 15 and 16 are flowcharts of exemplary embodiments of controlling Internet access according to a device type of a wireless terminal, FIG. 17 is a flowchart of an exemplary embodiment of controlling Internet access according to a current operating state of an image forming apparatus, FIG. 18 is a flowchart of an exemplary embodiment of controlling Internet access according to whether a received packet is a packet to execute a printing function, and FIG. 19 is a flowchart of an exemplary embodiment of controlling Internet access according to a user setting.

Referring to FIG. 15, the image forming apparatus is connected to the Internet in operation S1501, and starts operating as a GO in operation S1503. The image forming apparatus operating as a GO, upon receiving a WiFi Direct connection request from an external wireless terminal in operation S1505, identifies a device type of the wireless terminal based on device information received from the wireless terminal in operation S1507. The image forming apparatus determines whether the identified device type of the wireless terminal is an Interne-access-permitted device type in operation S1509, such that if the identified device type of the wireless terminal is the Internet-access-permitted device type, the image forming apparatus proceeds to operation S1511 to allocate a WiFi Direct interface IP address of the image forming apparatus to a gateway address to the wireless terminal and complete WiFi Direct connection. Upon receiving a packet destined to a server in the Internet from the wireless terminal in operation S1513, the image forming apparatus translates a source IP address included in the received packet into an IP address of the image forming apparatus and sends the packet to the destined server in operation S1515. If determining that the identified device type of the wireless terminal is an Internet-access-prohibited device type in operation S1509, the image forming apparatus proceeds to operation S1517 to allocate no gateway address or a null value to the wireless terminal and complete WiFi Direct connection with the wireless terminal.

Referring to FIG. 16, the image forming apparatus is connected to the Internet in operation S1601, and starts operating as a GOP in operation S1603. The image forming apparatus operating as a GO, upon receiving a WiFi Direct connection request from an external wireless terminal in operation S1605, allocates a network address including an IP address, a gateway address, a subnet mask, and a DNS server address to the wireless terminal and completes WiFi Direct connection with the wireless terminal in operation S1607.

Upon receiving a packet destined to a server in the Internet from the wireless terminal in operation S1609, the image forming apparatus determines whether a device type of the wireless terminal is an Internet-access-permitted device type in operation S1611. If the device type of the wireless terminal is an Internet-access-permitted device type, the image forming apparatus proceeds to operation S1613 to translate a source IP address included in the received packet into the IP address of the image forming apparatus and send the packet to the destined server, Otherwise, if the device type of the wireless terminal is an Internet-access-prohibited device type, the image forming apparatus terminates the process.

Referring to FIG. 17, the image forming apparatus is connected to the Internet in operation S1701, and starts operating as a GOP in operation S1703. The image forming apparatus operating as a GO, upon receiving a WiFi Direct connection request from an external wireless terminal in operation S1705, allocates a network address including an IP address, a gateway address, a subnet mask, and a DNS server address to the wireless terminal and completes WiFi Direct connection with the wireless terminal in operation S1707.

Upon receiving a packet destined to a server in the Internet from the wireless terminal in operation S1709, the image forming apparatus determines whether a current operating state of the image forming apparatus is an operating state in which Internet access is permitted in operation S1711. If the current operating state is the Internet-access-permitted operating state, the image forming apparatus proceeds to operation S1713 to translate a source IP address included in the received packet into the IP address of the image forming apparatus and send the packet to the destined server. Otherwise, if the current operating state is the Internet-access-prohibited operating state, the image forming apparatus terminates the process.

Referring to FIG. 18, the image forming apparatus is connected to the Internet in operation S1801, and starts operating as a GOP in operation S1803. The image forming apparatus operating as a GO, upon receiving a WiFi Direct connection request from an external wireless terminal in operation S1805, allocates a network address including an IP address, a gateway address, a subnet mask, and a DNS server address to the wireless terminal and completes WiFi Direct connection with the wireless terminal in operation S1807.

Upon receiving a packet destined to a server in the Internet from the wireless terminal in operation S1809, the image forming apparatus checks a network port included in the received packet in operation S1811. The image forming apparatus determines based on the checked network port whether the received packet is a packet to execute a printing function in operation S1813. If the received packet is the packet to execute a printing function, the image forming apparatus proceeds to operation S1815 to translate a source IP address included in the received packet into the IP address of the image forming apparatus and send the packet to the destined server. Otherwise, if the received packet is not the packet to execute a printing function, the image forming apparatus terminates the process.

Referring to FIG. 19, the image forming apparatus is connected to the Internet in operation S1901, and starts operating as a GOP in operation S1903. The image forming apparatus operating as a GO, upon receiving a WiFi Direct connection request from an external wireless terminal in operation S1905, checks a user setting with respect to Internet access of the wireless terminal in operation S1907. The image forming apparatus determines whether the Internet access of the wireless terminal is set to be permitted in operation S1909, such that if the Internet access of the wireless terminal is set to be permitted, the image forming apparatus proceeds to operation S1911 to allocate a WiFi Direct interface IP address of the image forming apparatus to the gateway address of the wireless terminal and complete WiFi-Direct connection. Upon receiving a packet destined to a server in the Internet in operation S1913, the image forming apparatus translates a source IP address included in the received packet into the IP address of the image forming apparatus and sends the packet to the destined server in operation S1915. If Internet access of the wireless terminal is set to be prohibited, the image forming apparatus proceeds to operation S1917 to allocate no gateway address or a null value to the wireless terminal and complete WiFi-Direct connection with the wireless terminal.

As such, when the wireless terminal that is WiFi-Direct connected to the image forming apparatus requests Internet access through the image forming apparatus, the image forming apparatus determines whether to permit or prohibit Internet access according to a predetermined criterion and permits or prohibits Internet access according to the determination result, rather than permitting Internet access at all times, thereby efficiently using resources of the image forming apparatus.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus that supports WiFi Direct, the image forming apparatus comprising:
   a user interface unit to receive a command from a user;
   a WiFi-Direct connection unit to perform WiFi-Direct connection with an external wireless terminal;
   an Internet connection unit to perform connection to the Internet;
   a control unit to permit or prohibit Internet access of the WiFi-Direct connected wireless terminal by using the Internet connection unit;
   a soft access point (AP) module to allow the image forming apparatus to operate as an AP in WiFi-Direction connection with the wireless terminal;
   a dynamic host configuration protocol (DHCP) server module to allocate a network address to the wireless terminal if the image forming apparatus operates as an AP; and
   an image forming operation execution unit to perform an image forming operation under control of the control unit.

2. The image forming apparatus of claim 1, wherein the control unit comprises:
   a network address translation (NAT) execution unit to translate a network address included in a packet transmitted from the wireless terminal and transmitting the packet to the Internet connection unit; and
   an NAT management unit to control the NAT execution unit according to whether Internet access of the wireless terminal is permitted or prohibited.

3. The image forming apparatus of claim 2, wherein the control unit identifies a device type of the wireless terminal and permits or prohibits Internet access of the wireless terminal according to the identified device type.

4. The image forming apparatus of claim 3, wherein if the identified device type is an Internet-access-prohibited device type, the control unit controls the DHCP server module to allocate no gateway address or a null value to the wireless terminal.

5. The image forming apparatus of claim 3, wherein if the identified device type is an Internet-access-prohibited device type, the NAT management unit controls the NAT execution unit not to translate a network address included in the packet transmitted from the wireless terminal.

6. The image forming apparatus of claim 2, wherein the control unit permits or prohibits Internet access of the wireless terminal according to a current operating state of the image forming apparatus.

7. The image forming apparatus of claim 6, wherein if the current operating state of the image forming apparatus is an operating state in which Internet access is prohibited, the NAT management unit controls the NAT execution unit not to translate a network address included in the packet transmitted from the wireless terminal.

8. The image forming apparatus of claim 2, wherein the control unit permits Internet access of the wireless terminal if the packet transmitted from the wireless terminal is a packet to execute a printing function, and prohibits Internet access of the wireless terminal if the transmitted packet is not the packet to execute the printing function.

9. The image forming apparatus of claim 8, wherein the control unit checks a network port included in the packet transmitted from the wireless terminal to determine whether the transmitted packet is the packet to execute the printing function.

10. The image forming apparatus of claim 2, wherein the control unit permits or prohibits Internet access of the wireless terminal according to user setting input through the user interface.

11. A method of controlling Internet access in an image forming apparatus that supports WiFi Direct, the method comprising:
   performing connection to the Internet;
   driving a soft access point (AP) module provided in the image forming apparatus to allow the image forming apparatus to operate as an AP;
   receiving a WiFi-Direct connection request from an external wireless terminal;
   driving a dynamic host configuration protocol (DHCP) server module provided in the image forming apparatus to allocate a network address to the wireless terminal and perform WiFi-Direct connection with the wireless terminal;
   receiving a request to perform Internet access through the image forming apparatus from the wireless terminal;
   determining whether to permit or prohibit Internet access of the wireless terminal; and
   permitting or prohibiting Internet access of the wireless terminal according to a result of the determination.

12. The method of claim 11, wherein the receiving of the request to perform Internet access comprises receiving a packet destined to a server in the Internet from the wireless terminal.

13. The method of claim 12, wherein the permitting or prohibiting of Internet access comprises translating a network address included in the received packet and sending the packet to the server in the Internet if Internet access is permitted, and not sending the received packet to the server in the Internet if Internet access is prohibited.

14. The method of claim 11, wherein the allocating of the network address to the wireless terminal and the performing of WiFi-Direct connection with the wireless terminal comprise allocating no gateway address or a null value to the wireless terminal if a device type of the wireless terminal is an Internet-access-prohibited device type or Internet access is set to be prohibited with respect to the WiFi-Direct connected wireless terminal.

15. The method of claim 11, wherein the determining comprises identifying a device type of the wireless terminal and determining whether to permit or prohibit Internet access of the wireless terminal according to the identified device type.

16. The method of claim 11, wherein the determining comprises checking a current operating state of the image forming apparatus and determining whether to permit or prohibit Internet access of the wireless terminal according to the checked current operating state of the image forming apparatus.

17. The method of claim 11, wherein the receiving of the request to perform Internet access comprises receiving a packet destined to a server in the Internet from the wireless terminal, the determining comprises determining whether the received packet is a packet to execute a printing function; and if the received packet is the packet to execute the printing function, determining to permit Internet access of the wireless terminal, and if the received packet is not the packet to execute the printing function, determining to prohibit Internet access of the wireless terminal.

18. The method of claim 17, wherein the determining of whether the received packet is the packet to execute the printing function comprises checking a network port included in the received packet and determining based on the checked network port whether the received packet is the packet to execute the printing function.

19. The method of claim 11, wherein the determining comprises determining whether to permit or prohibit Internet access of the wireless terminal according to setting input from the user.

20. A non-transitory computer-readable medium having recorded thereon a program to execute a method of claim 11 on a computer.

21. An image forming apparatus that supports WiFi Direct, the image forming apparatus comprising:
 a WiFi-Direct connection unit to perform WiFi-Direct connection with a WiFi Direct external wireless terminal;
 a control unit to determine whether to prohibit Internet access of the WiFi Direct connected external wireless terminal based on a device type of the WiFi Direct connected external wireless terminal; and
 a dynamic host configuration protocol (DHCP) server module to allocate a network address to the WiFi Direct connected external wireless terminal based on the determination of the control unit.

22. The image forming apparatus of claim 21, further comprising:
 a user interface to allow a user to input a device discovery request to find WiFi Direct external wireless terminals neighboring the image forming apparatus.

23. The image forming apparatus of claim 22, wherein the user interface displays a list of the WiFi Direct external wireless terminals neighboring the image forming apparatus to allow a user to select at least one of the WiFi Direct external wireless terminals neighboring the image forming apparatus.

24. The image forming apparatus of claim 21, wherein the Internet access of the WiFi Direct connected external wireless terminal is prohibited when the device type corresponds to a device that is able to download a large-volume file.

25. The image forming apparatus of claim 24, wherein the large-volume file is at least 10 MB.

26. The image forming apparatus of claim 21, further comprising:
 an image forming operation execution unit to execute an image forming operation under control of the control unit.

27. The image forming apparatus of claim 26, wherein the prohibiting of the Internet access is based on an operation state of the image forming apparatus based on the executed image forming operation.

28. The image forming apparatus of claim 27, wherein the prohibiting of the Internet access is performed if the image forming operation would be disrupted as a result of the Internet access.

29. The image forming apparatus of claim 21, wherein the prohibiting of the Internet access is performed by the control unit controlling the DHCP server module to allocate no network address to the WiFi Direct connected external wireless terminal.

30. The image forming apparatus of claim 21, wherein the control unit comprises:
 a network address translation (NAT) execution unit to translate a network address of a data packet destined to a server within the Internet from the WiFi Direct connected external wireless terminal; and
 an Internet connection unit to receive the data packet and to allow the data packet to be sent to the destined server.

31. The image forming apparatus of claim 30, wherein the prohibiting of the Internet access is performed by the NAT execution unit not performing NAT with the received packet and not transmitting the received packet to the destined server.

* * * * *